(12) United States Patent
Debe et al.

(10) Patent No.: US 8,748,330 B2
(45) Date of Patent: Jun. 10, 2014

(54) ANNEALED NANOSTRUCTURED THIN FILM CATALYST

(75) Inventors: Mark K. Debe, Stillwater, MN (US); Robert L. W. Smithson, Mahtomedi, MN (US); Charles J. Studiner, IV, Cottage Grove, MN (US); Susan M. Hendricks, Lake Elmo, MN (US); Michael J. Kurkowski, White Bear Lake, MN (US); Andrew J. L. Steinbach, St. Anthony Village, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 13/643,431

(22) PCT Filed: Apr. 26, 2011

(86) PCT No.: PCT/US2011/033972
§ 371 (c)(1),
(2), (4) Date: Oct. 25, 2012

(87) PCT Pub. No.: WO2011/139705
PCT Pub. Date: Nov. 10, 2011

(65) Prior Publication Data
US 2013/0045859 A1 Feb. 21, 2013

Related U.S. Application Data

(60) Provisional application No. 61/328,064, filed on Apr. 26, 2010.

(51) Int. Cl.
*B01J 37/34* (2006.01)

(52) U.S. Cl.
USPC ........... 502/5; 977/840; 502/325; 423/237

(58) Field of Classification Search
CPC ............... B01D 53/8634; B01D 53/58; B01D 2257/406; B01D 53/34; C01C 1/12
USPC .......... 502/5, 325; 907/840; 423/237
See application file for complete search history.

(56) References Cited

U.S. PATENT DOCUMENTS

| | | | |
|---|---|---|---|
| 4,812,352 A | 3/1989 | Debe | |
| 5,039,561 A | 8/1991 | Debe | |
| 5,176,786 A | 1/1993 | Debe | |
| 5,336,558 A | 8/1994 | Debe | |
| 5,338,430 A | 8/1994 | Parsonage et al. | |
| 5,798,148 A | 8/1998 | Thomas et al. | |

(Continued)

OTHER PUBLICATIONS

International Search Report, Form PCT/ISA/210, International Application No. PCT/US2011/033972, International Filing Date: Apr. 25, 2011, 3 pages.

(Continued)

*Primary Examiner* — Colleen Dunn
*Assistant Examiner* — Haytham Soliman
(74) *Attorney, Agent, or Firm* — Gregory D. Allen; Philip Y. Dahl

(57) ABSTRACT

This disclosure provides methods of making an enhanced activity nanostructured thin film catalyst by radiation annealing, typically laser annealing, typically under inert atmosphere. Typically the inert gas has a residual oxygen level of 100 ppm. Typically the irradiation has an incident energy fluence of at least 30 mJ/mm$^2$. In some embodiments, the radiation annealing is accomplished by laser annealing. In some embodiments, the nanostructured thin film catalyst is provided on a continuous web.

20 Claims, 19 Drawing Sheets

(56) References Cited

U.S. PATENT DOCUMENTS

| | | |
|---|---|---|
| 5,879,827 A | 3/1999 | Debe et al. |
| 5,879,828 A | 3/1999 | Debe et al. |
| 6,040,077 A | 3/2000 | Debe et al. |
| 6,319,293 B1 | 11/2001 | Debe et al. |
| 6,482,763 B2 | 11/2002 | Haugen et al. |
| 7,419,741 B2 | 9/2008 | Vernstrom et al. |
| 7,622,217 B2 | 11/2009 | Debe et al. |
| 2003/0194600 A1 | 10/2003 | Pan |
| 2005/0069755 A1 | 3/2005 | Vernstrom et al. |

OTHER PUBLICATIONS

Vojislav Stamenkovic & Nenad Markovic; Argonne National Laboratory, "Nanosegregated Surfaces as Catalysts for Fuel Cells", received by 3M under CDA-07823, 20 pages.

Stamenkovic, V. et al; "*Trends In Electrocatalysis on Extended and Nanoscale Pt-bimetallic Alloy Surfaces*", Nature Materials, vol. 6, Mar. 2007, pp. 241-247.

Stamenkovic, V. et al; "*Effect of Surface Composition on Electronic Structure, Stability, and Electrocatalytic Properties of Pt-Transition Metal Alloys: Pt-Skin versus Pt-Skeleton Surfaces*", Journal American Chemical Society, vol. 128, No. 27, 2006, pp. 8813-8819.

Stamenkovic, V. et al: "*Surface Composition Effects in Electrocatalysis: Kinetics of Oxygen Reduction on Well-Defined $Pt_3Ni$ and $Pt_3Co$ Alloy Surfaces*", J. Phys. Chem. B, vol. 106, No. 46, 2002, pp. 11970-11979.

Stamenkovic, V. et al; "*Surface Segregation Effects in Electrocatalysis: Kinetics of Oxygen Reduction Reaction on Polycrystalline $Pt_3Ni$ Alloy Surfaces*", Journal of Electroanalytical Chemistry, 554-555, 2003, pp. 191-199.

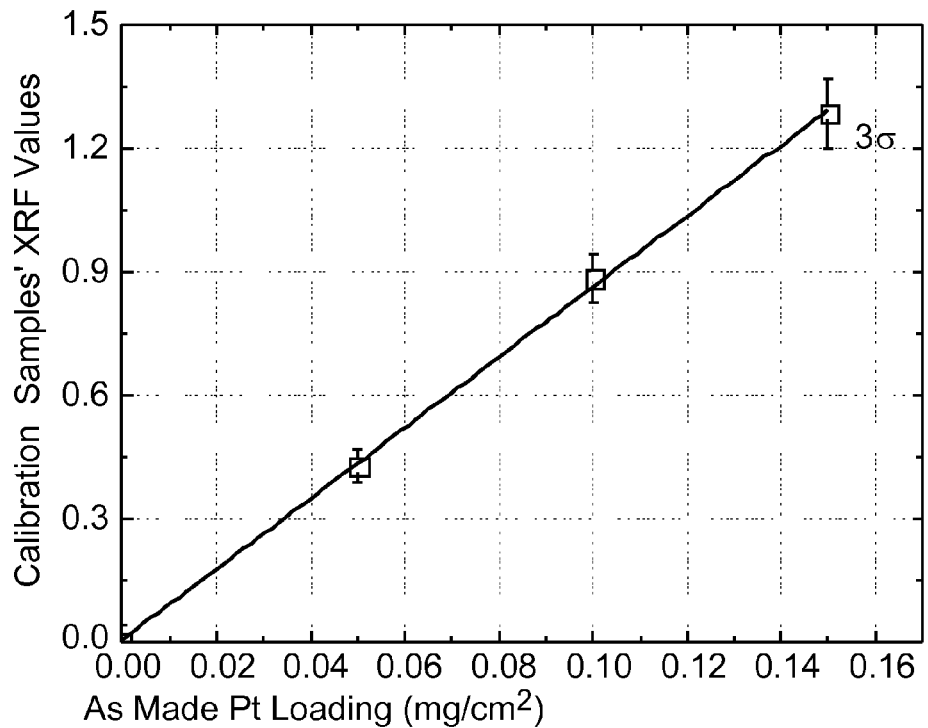
FIG. 5A  □ XRF
— Linear Fit of Sheet1 Calibration Samples' XRF Values
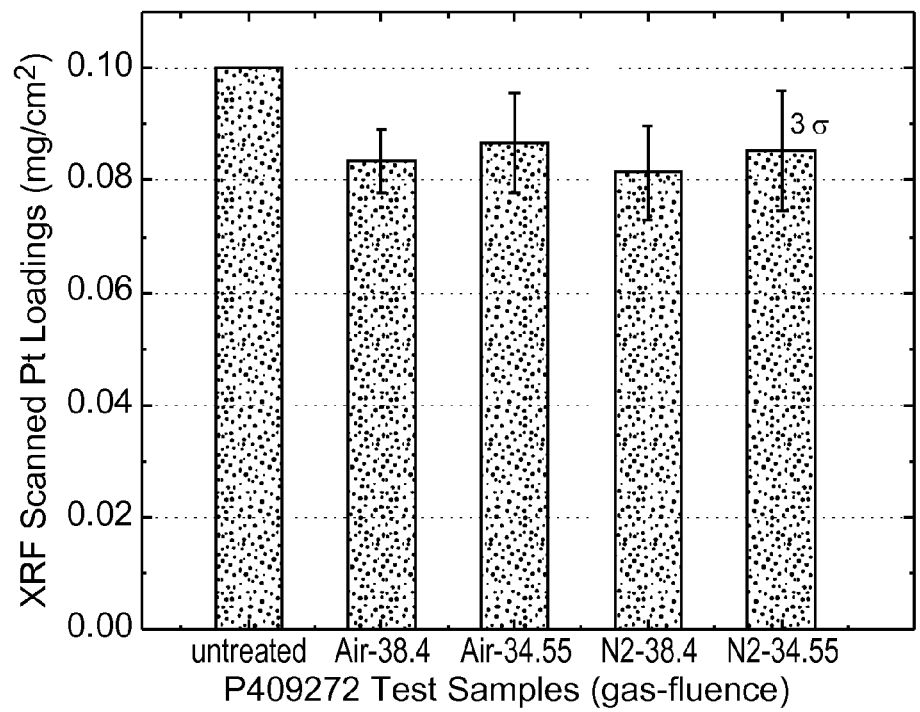
FIG. 5B  ▨ Mean Pt loading

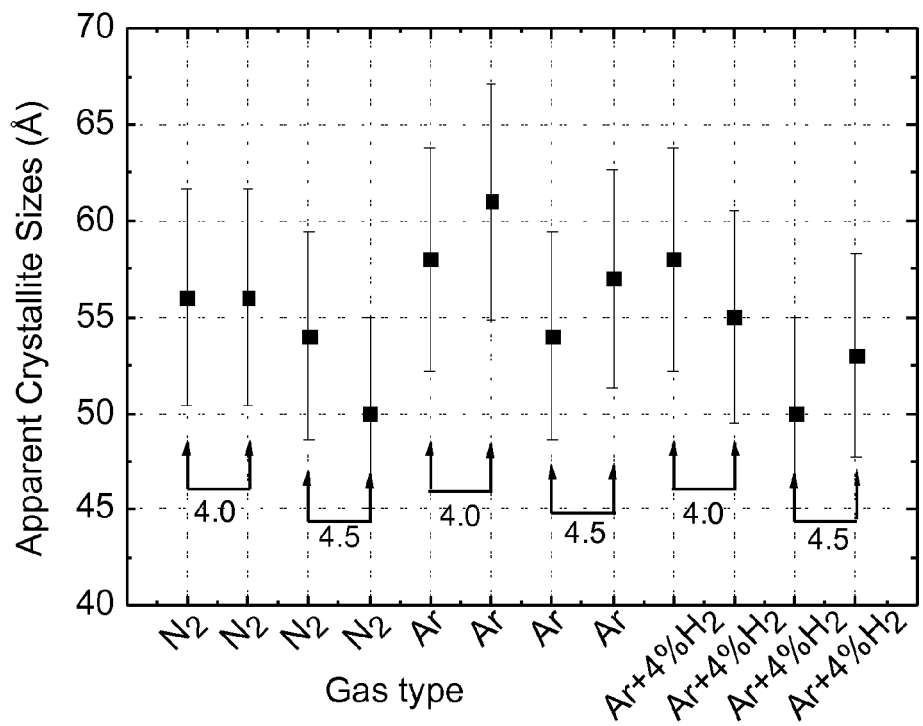
FIG. 9A ■ FCC (220)
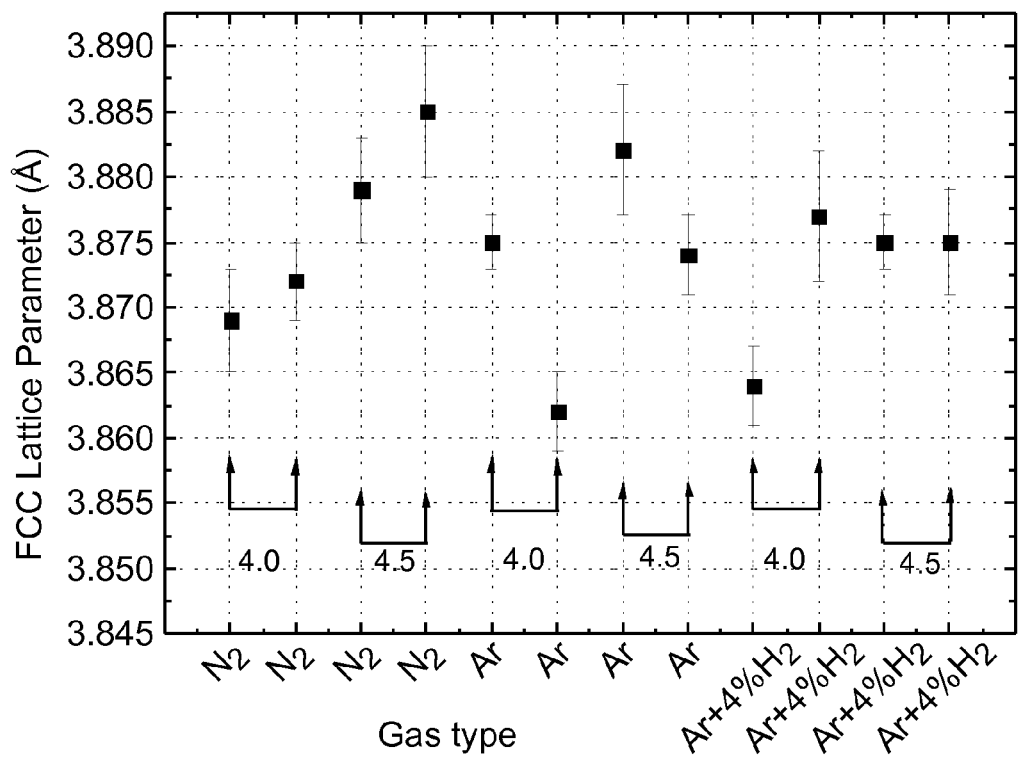
FIG. 9B ■ Mean (Std Dev)

Specific activity at 900mV.

Mass activity at 900mV.

ANNEALED NANOSTRUCTURED THIN FILM CATALYST

This invention was made with Government support under Cooperative Agreement DE-FG36-07G017007 awarded by DOE. The Government has certain rights in this invention.

FIELD OF THE INVENTION

This disclosure relates to methods of making an enhanced activity nanostructured thin film catalyst by radiation annealing, typically laser annealing, typically under inert atmosphere.

BACKGROUND OF THE DISCLOSURE

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. Pat. No. 7,419,741, the disclosure of which is incorporated herein by reference, discloses fuel cell cathode catalysts comprising nanostructures formed by depositing alternating layers of platinum and a second layer onto a microstructure support, which may form a ternary catalyst.

U.S. Pat. No. 7,622,217, the disclosure of which is incorporated herein by reference, discloses fuel cell cathode catalysts comprising microstructured support whiskers bearing nanoscopic catalyst particles comprising platinum and manganese and at least one other metal at specified volume ratios and Mn content, where other metal is typically Ni or Co.

SUMMARY OF THE DISCLOSURE

Briefly, the present disclosure provides a method of making an enhanced activity catalyst comprising the steps of: a) providing a nanostructured thin film catalyst; and b) radiation annealing the nanostructured thin film catalyst under an inert gas having a residual oxygen level of 100 ppm or less by irradiation at an incident energy fluence of at least 30 mJ/mm$^2$. In some embodiments, the inert gas has a residual oxygen level of 50 ppm or less. In some embodiments, the incident energy fluence is between 35 and 40 mJ/mm$^2$. In some embodiments, step b) of radiation annealing is laser annealing. In some embodiments, step b) of radiation annealing is laser annealing by use of a CO$_2$ laser. In some embodiments, step b) of radiation annealing is electron beam annealing. In some embodiments, the nanostructured thin film catalyst is provided on a continuous web.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"thin film of nanoscopic catalyst particles" includes films of discrete nanoscopic catalyst particles, films of fused nanoscopic catalyst particles, and films of nanoscopic catalyst grains which are crystalline or amorphous; typically films of discrete or fused nanoscopic catalyst particles, and most typically films of discrete nanoscopic catalyst particles;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same area as the projected area of the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein).

It is an advantage of the present disclosure to provide catalysts for use in fuel cells.

Objects and advantages of this disclosure are further illustrated by the following examples, but the particular materials and amounts thereof recited in these examples, as well as other conditions and details, should not be construed to unduly limit this disclosure.

BRIEF DESCRIPTION OF THE DRAWING

FIG. 5A is a graph demonstrating XRF measurement of the Pt loading remaining on laser treated samples exposed under air or N2 at 4 or 4.5 m/sec, as discussed in Example 2.

FIG. 5B is a graph demonstrating XRF calibration curve from samples made with 0.05, 0.10 and 0.15 mg/cm² of Pt in PtCoMn, as discussed in Example 2.

FIGS. 9A to 9D are graphs of PT grain sizes and lattice constants vs. gas type, as discussed in Example 2.

DETAILED DESCRIPTION

This disclosure describes a post-fabrication process to increase the activity for oxygen reduction of the nanostructured thin film (NSTF) PEM fuel cell electrocatalysts. It consists of laser annealing, electron beam annealing, or other radiation annealing of the catalyst alloy coated NSTF whiskers in an inert gas, with minimal residual oxygen level of 100 ppm or less, with an incident fluence of at least 30 mJ/mm². The result is a 50% increase in mass activity $(A/mg_{Pt})$ of NSTF-PtCoMn alloy using a scanning $CO_2$ laser at 4 m/sec. It is compatible with a moving web process.

Pt based alloys are currently the best electrocatalysts for the use on the cathodes of PEM fuel cells under development for automotive applications. There are two basic types of catalysts in use, the standard being dispersed Pt nanoparticles supported on carbon black. The newer alternative is the nanostructured thin film catalyst, referred to as NSTF. This disclosure demonstrates a method to increase the mass activity of the as-made catalyst, by exposing the catalyst coated whiskers on a web under an inert gas atmosphere such as Ar to a scanning laser, such as an industrial $CO_2$ laser. Under the right energy fluence between 35 and 40 mJ/mm², and with residual oxygen levels below about 50 ppm, the mass activity is increased from an average of 0.175 A/mg to 0.265 A/mg. Significant gains in the Pt fcc crystallite grain size and surface area are also observed. The process of the present disclosure is readily adaptable to a roll-good process.

Objects and advantages of this disclosure are further illustrated by the following examples, but the particular materials and amounts thereof recited in these examples, as well as other conditions and details, should not be construed to unduly limit this disclosure.

EXAMPLES

NSTF Catalyst Preparation

NSTF PtCoMn alloy catalysts were prepared on the PR149 whisker supports as described in recently issued and allowed patents, U.S. Pat. No. 7,419,741, 2005/0069755 and 60854US02. Samples with as-made Pt loadings of 0.10 $mg_{Pt}$/cm² on 2200-3 standard PR 149 whiskers were prepared. Rectangular shaped sample pieces were cut 5"×8" and mounted between two metal frames with open centers for laser exposure.

Laser Set-up and Scanning Conditions

For the laser processing of the fuel cell catalyst, the following equipment was used. The $CO_2$ laser from Coherent, Inc. (5100 Patrick Henry Drive, Santa Clara, Calif. 95054) was Model Diamond C-55A. The scanner from Nutfield Technology, Inc. (49 Range Road, Windham, N.H. 03087) was Model XLR8-15 mm 2-axis scan head. These two pieces equipment were controlled with a computer using the Waverunner laser and scanner control software interface and the Pipeline Control Rack, both also from Nutfield Technology, Inc.

Figure 1:
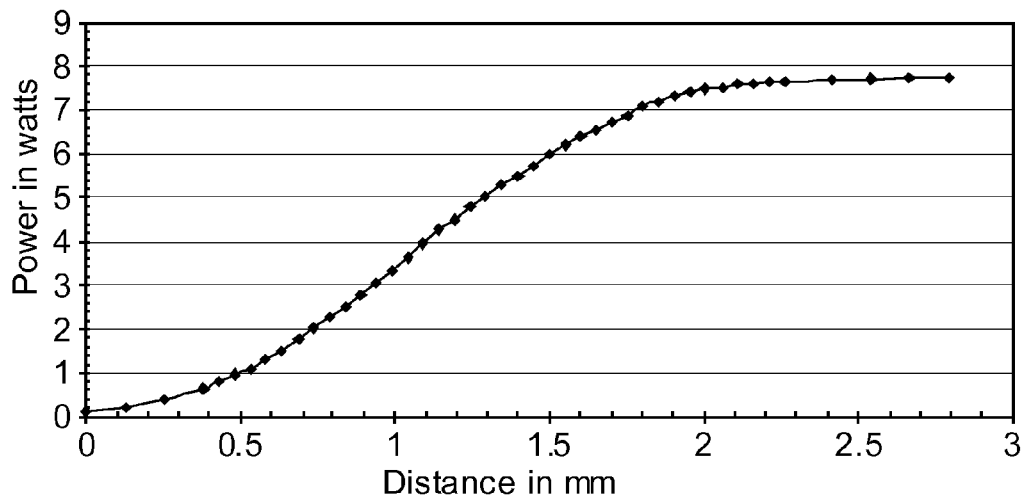
FIG. 1 is a graph of nominal laser power at the processing plane for a laser beam used in an embodiment of a process according to the present disclosure, where the beam is at least partly obstructed by a razor blade, where the x-axis represents the blade position starting from a starting position blocking all of the beam until completely out of the laser beam path.

The scanner was set up to process a field size of 266 mm square with a focused spot at a working distance of approximately 390 mm. For processing the fuel cell catalyst samples, the material was placed above this focused plane by approximately 75 mm, that is at a working distance of 315 mm. In the processing plane, the laser spot size was roughly 1 mm in diameter. This beam shape was characterized by passing a razor through the beam in the plane at 315 mm working distance. The nominal beam size was identified between the limits of 15% and 85% of total power being eclipsed by the razor blade. The raw data is shown in FIG. 1 of laser power versus razor blade position. FIG. 1 is a chart of nominal power measurements for the laser beam at the processing plane as a razor blade moves from a starting position blocking all of the beam until completely out of the laser beam path. Measurements in the orthogonal direction replicated this curve shape.

The laser output was turned on and then scanned horizontally across the sample from the point of view looking down on the sample. The laser output was momentarily stopped while the scanner incremented a small distance orthogonal to the scan direction. Then the laser output was turned on again and horizontally scanned in the reverse direction. This process, or raster scanning, was repeated until the entire sample was exposed.

The laser processing conditions for these samples were set by entering parameters in the software control interface for laser power, scanning speed, and orthogonal offset distance or "hatch" separation. For the laser power, the pulse length of 30 microseconds and repetition rate of 20 kHz created an average power delivered to the sample of 37 Watts. The laser scanning speed was varied to effect different incident fluences or energy density delivered to the catalyst surface, where this speed is of the laser beam in the focused plane. The actual speed of the laser beam in the processing plane is approximately 80% of this value since the laser beam is on shorter scanning radius at the decreased working distance. The scanning speed recorded in this Record of Disclosure is that in the focal plane. For the "hatch" separation, that parameter was set selected to be 0.25 mm for the samples in Examples 1 and 2, which gave a 0.20 mm displacement in the processing plane.)

Figure 2:
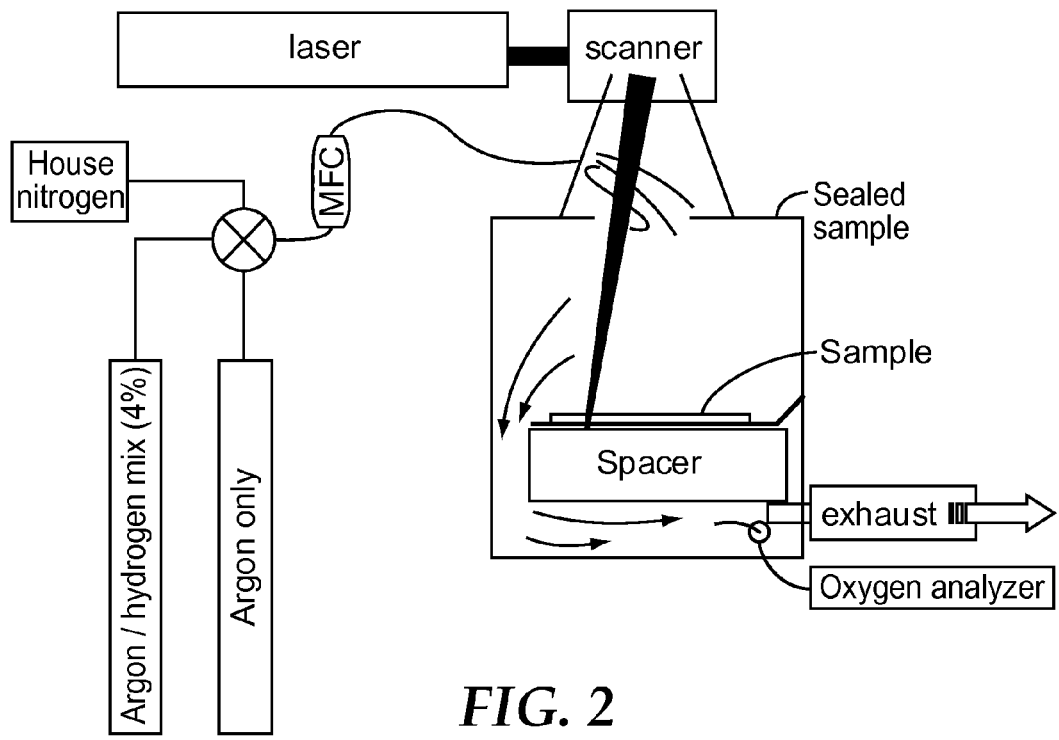
FIG. 2 is a schematic diagram of an apparatus used in performing one embodiment of the process of the present disclosure.

FIG. 2 presents one embodiment of an apparatus for laser annealing the sample films under a controlled ambient environment with residual oxygen analysis. FIG. 2 illustrates the laser set up used for rastering the laser beam over the sample surface in a rectangular pattern under a controlled ambient environment as well as air. A METEK TM-1B oxygen analyzer was used to monitor the residual oxygen in the sample chamber when inert gases were flowed into the sealed sample chamber.

An MKS mass flow controller was used to control the rate of gas flow into the sealed sample chamber at the rate of 100 slm. The residual $O_2$ level was monitored after introducing the gas of choice until the $O_2$ level fell below about 40 ppm, at which time the laser was triggered to scan a rectangular pattern over the sample of ~5" square.

Five sets of catalyst samples were treated in order to investigate the effects on fuel cell performance. For the first two sets, the laser was scanned at rates between 2.5 and 7.5 m/sec and variable translation rates (hatch) with ambient air environment, in order to first find the incident fluence (energy per unit area) and scanning conditions that would introduce a change in the catalyst layer, as evidenced by either complete ablation of the catalyst coated whiskers off the MCTS substrate, or increases in the Pt crystallite grain sizes as revealed by X-ray diffraction. SEM images of the first and second sets of laser exposed samples did not show any apparent change in the NSTF whiskers up to 50,000 magnification. No statistically significant changes in the fuel cell performance curves or kinetic activity metrics could be identified with the conditions used for the first two sample sets.

For the third set of samples it was determined that in some embodiments preferred scan rates were 4 to 4.5 m/sec with a 0.25 mm translation on each return path of the laser beam. This delivered an estimated fluence of 34.55 to 38.5 $mJ/mm^2$ to the catalyst surface. XRD characterization of the $3^{rd}$ set showed a clear dependence of Pt(hk1) grain size on fluence (Example 1 below). In all samples, the laser scan direction was maintained parallel to the down-web direction of the catalyst samples or parallel to the MCTS substrate grooves. Fuel cell testing indicated a small but statistically significant increase in ORR activity with incident fluence, but other parameters were insensitive. TEM imaging of NSTF catalyst coated whiskers from a treated (#3-4 in Table 1) vs. an untreated sample suggest a very small amount of surface smoothing at the highest levels of magnification. Characterization by TEM of the atomic planes of the fcc(111) vs. other (hkl) facets on the catalyst surface is ongoing since this may be the level at which the surface is being changed to induce the changes in fuel cell activity observed in the $4^{th}$ series.

For the $4^{th}$ set of samples, the ambient gas environment was varied. Fuel cell testing was completed for this $4^{th}$ set. XRD results were consistent with those in Ex. 1 in that the higher the fluence the larger the crystallite grain size. The primary variables for the $4^{th}$ set were the type of ambient gas, viz. air, $N_2$, Ar and Ar+4% $H_2$, and two scan rates, 4 and 4.5 m/sec. Significant increases in ORR activity, surface area, and specific activity were observed as a function of the type of inert gas and incident fluence (Example 2 below.) During the laser exposure, clear visible trails of smoke emanated from the surface, with more apparent at the 4 m/sec higher fluence condition. Another key observation was that during the laser scan, the $O_2$ level dropped from its steady state value by about 50% at the 4 m/sec scan rate and 30% at the 4.5 m/sec scan rate. This indicates the Pt surface was being cleaned and made more reactive for oxygen adsorption, acting in effect as a getter material. This suggested that some Pt might be being removed from the surface at the conditions used, which would affect the mass activity measurements. Additional samples were then exposed under air and $N_2$ at both 4 and 4.5 m/s scan rates for XRF characterization of the amount of Pt lost. For this XRF measurement, a scanning unit made by NDC Infrared Engineering was used to measure the average residual Pt. This unit averages over an area defined by a 1.25" circle translated 2 inches. Those results were reported in Example 2 below and used to determine the actual mass activity and mass specific surface area of the samples.

A $5^{th}$ set of samples used He and He+4% $H_2$ gases as well, and PtNi alloys were also treated. The purpose of the He is to see if the gas thermal conductivity is important. The PtNi alloys had different atomic percentages of transition metals. Preliminary data suggested that the laser annealing significantly improved the high current density performance of the high Ni containing alloy versus the as-made alloy.

Fuel Cell Testing

For fuel cell testing, the laser treated samples were used as the cathodes in a three layer catalyst coated membrane electrode assembly (CCM). The anode catalyst was standard NSTF PtCoMn at a Pt loading of 0.05 $mgPt/cm^2$, and all taken from the same roll-good lot of material, P409140B. The membranes used for all samples were 20 micron thick 850 EW proton exchange membrane, cast from methanol. The anode and cathode gas diffusion layers (GDL's) were identical. The catalysts and membrane were laminated together to form the CCM at 350° F. and 150 psig. The 5-layer MEA's were mounted in standard 50 $cm^2$ test cells with quad-serpentine flow fields with gaskets selected to give 15% compression of the MEA. All samples for sample sets 3 and 4 were measured on a single test station, number 6. After conditioning the MEA's using the NSTF standard thermal cycling protocol, the cathode surface area and ORR activity at 900 mV under saturated 150 kPa $H_2/O_2$ was measured. Various performance metrics were also recorded, including the potentiodynamic current density at 813 mV on the back scan, and galvanodynamic polarization potentials at 20 $mA/cm^2$, 0.32 $A/cm^2$, 1 $A/cm^2$, 1.46 $A/cm^2$ and 2 $A/cm^2$.

Example 1

Figure 3:
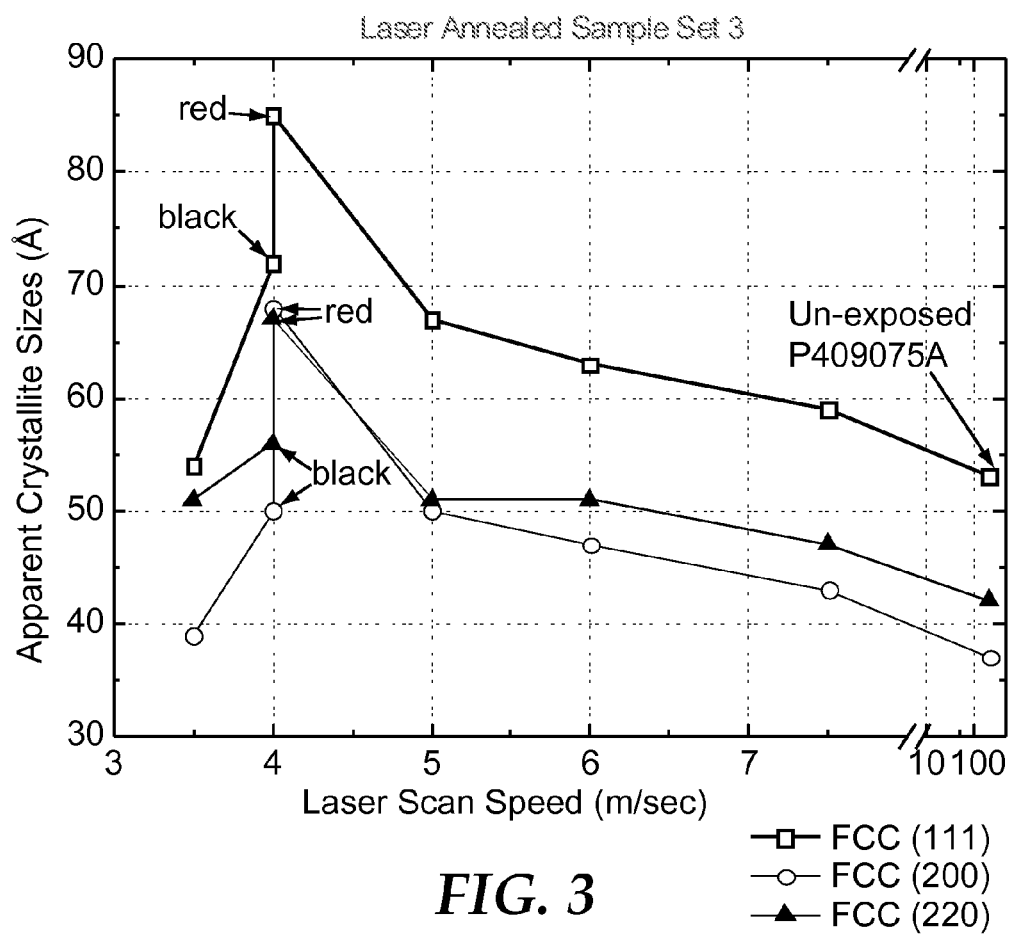
FIG. 3 is a graph of Pt fcc (hkl) grain size as measured by X-ray diffraction for the catalysts from Set #3, plotted as a function of the laser scan speed used to treat the catalysts, as discussed in Example 1.

In this example, a series of samples from sample set #3 were exposed under air with varying incident fluence to determine the impact on the Pt crystallite grain sizes. Scan rates of 3.5, 4, 5, 6 and 7.5 m/sec were compared to the unexposed sample. FIG. 3 is a graph of Pt fcc (hkl) grain size as measured by X-ray diffraction for the catalysts from Set #3, plotted as a function of the laser scan speed used to treat the catalysts. FIG. 3 shows the effect of the laser scan speed on the XRD determined crystallite grain sizes. The maximum grain size occurs at the scan rate of 4 m/sec, corresponding to an estimated fluence of 38.5 $mJ/mm^2$. At slower scan rates, higher fluence, the catalyst coated whiskers are observed to be ablated off the surface in substantial areas of the exposed sample region and this may be affecting the apparent crystallite size due to excessive heating and rapid cooling. These results indicate that a laser scan rate from about 4.5 to 4.0 m/sec would be sufficient to induce significant melting of the surface catalyst.

Figure 4A:
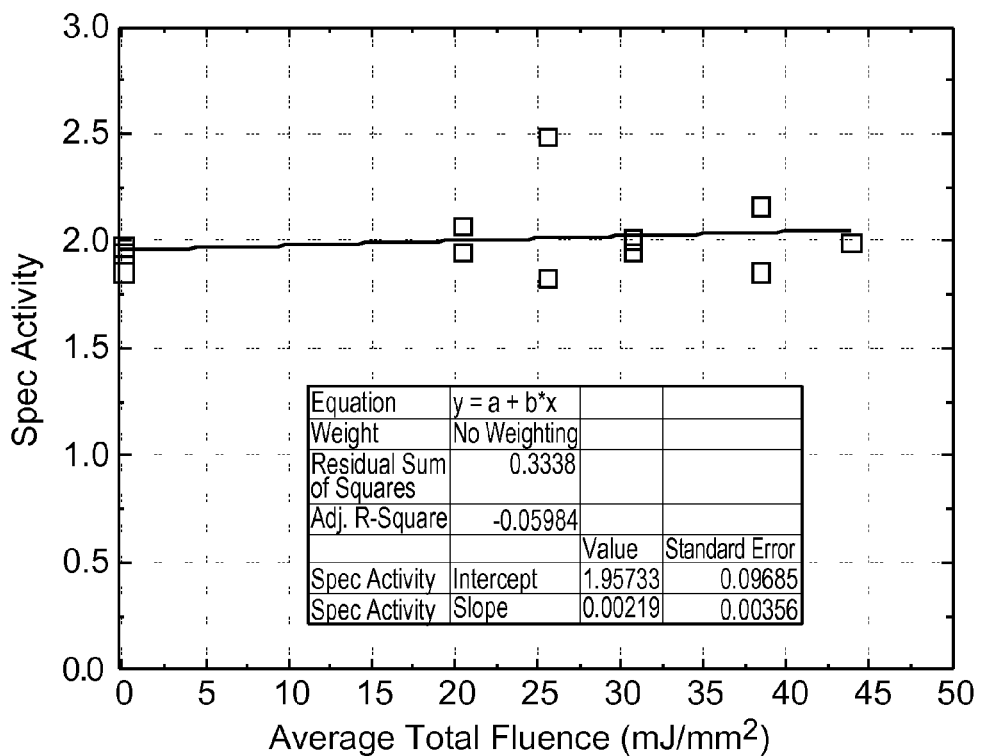
FIGS. 4A and 4B are graphs of specific activity (4A) fuel cell mass activity (4B) plotted as a function of fluence, as discussed in Example 1.
Figure 4B:
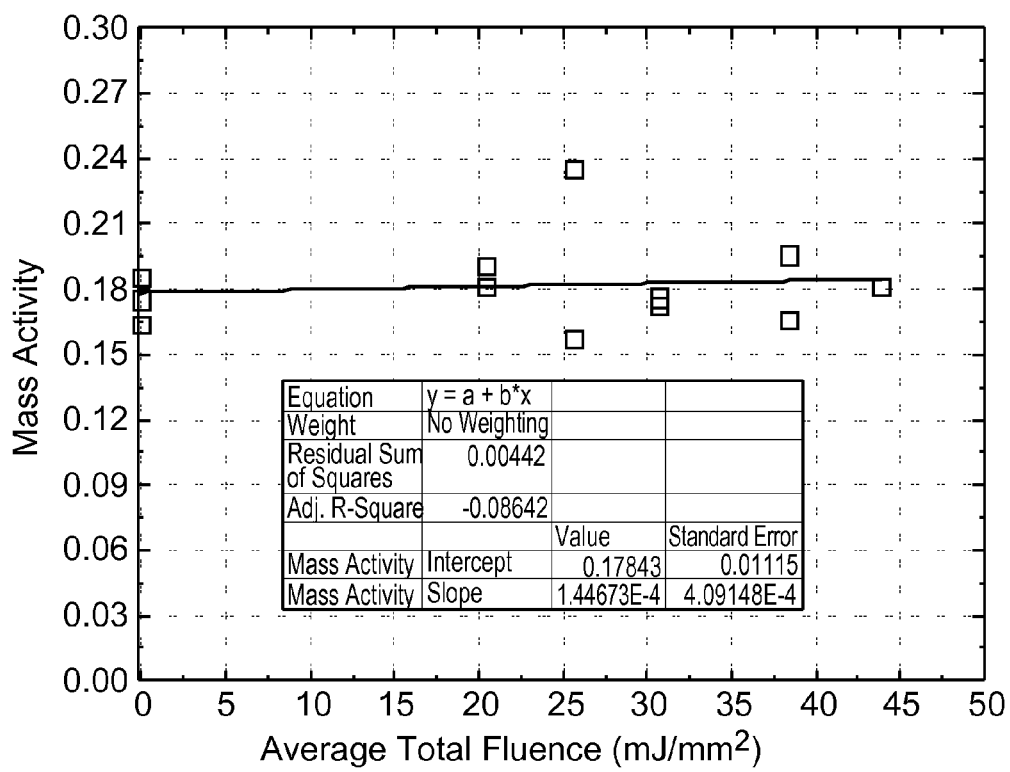

FIGS. 4A and 4B show the mass and specific activity from this set as a function of fluence. The fuel cell results indicated only a marginal effect of the laser annealing from this set, despite the clear effect on the Pt grain size in FIG. 3. The other fuel cell metrics were similar in showing no statistically significant or a marginal effect only. The reason for this lack of effect was suspected to be due to the presence of oxygen in the ambient air that would prevent the catalyst surface structure from annealing properly. So for the 4$^{th}$ set of samples, the primary variant was the ambient gas type, with oxygen minimized and monitored. For the air samples, it must also be considered that it contained ambient water vapor, which the inert gas environments did not.

Example 2

In this example a series of samples were exposed under controlled ambient gases with the relative fluence and residual O$_2$ levels identified in Table II.

TABLE II

Sample parameters for laser annealing set 4 (Example 2)

| Sample # | Catalyst Lot | Gas | Relative Fluence | Residual Oxygen (ppm) | FC Analysis Status |
|---|---|---|---|---|---|
| 4-0 | P409075A | N$_2$ | 38.4 | <40 | done |
| 4-1 | P409075A | N$_2$ | 38.4 | 37 | done |
| 4-2 | P409075A | N$_2$ | 38.4 | 38 | done |
| 4-3 | P409075A | N$_2$ | 34.55 | 36 | done |
| 4-4 | P409272 | N$_2$ | 34.55 | 38 | done |
| 4-5 | P409272 | Ar | 38.4 | 35 | done |
| 4-6 | P409272 | Ar | 34.55 | 36 | done |
| 4-7 | P409272 | Ar | 34.55 | 34 | done |
| 4-8 | P409272 | Ar | 38.4 | 35 | done |
| 4-9 | P409272 | Ar/4% H$_2$ | 34.55 | <40 | Sample ripped |
| 4-10 | P409272 | Ar/4% H$_2$ | 34.55 | <40 | done |
| 4-11 | P409272 | Ar/4% H$_2$ | 38.4 | <40 | done |
| 4-12 | P409272 | Ar/4% H$_2$ | 38.4 | <40 | done |

FIG. 5A is a graph demonstrating XRF measurement of the Pt loading remaining on laser treated samples exposed under air or N2 at 4 or 4.5 m/sec. FIG. 5B is a graph demonstrating XRF calibration curve from samples made with 0.05, 0.10 and 0.15 mg/cm$^2$ of Pt in PtCoMn.

FIGS. 5A and 5B show the results of the XRF calibration and measurement of the residual Pt remaining on laser treated samples in air and N$_2$ at fluences of 38.4 mJ/mm$^2$ (4 m/sec) and 34.55 mJ/mm$^2$ (4.5 m/sec). The initial mass loading of 0.10 mg/cm$^2$ of Pt was reduced by 15-20%. These values were used to correct the loadings used for calculating the mass activity and mass specific surface area for the samples in set #4. The same mass change measured for the samples exposed under N$_2$ is assumed to apply to the Ar and Ar+4% H$_2$ as well.

Figure 6A:
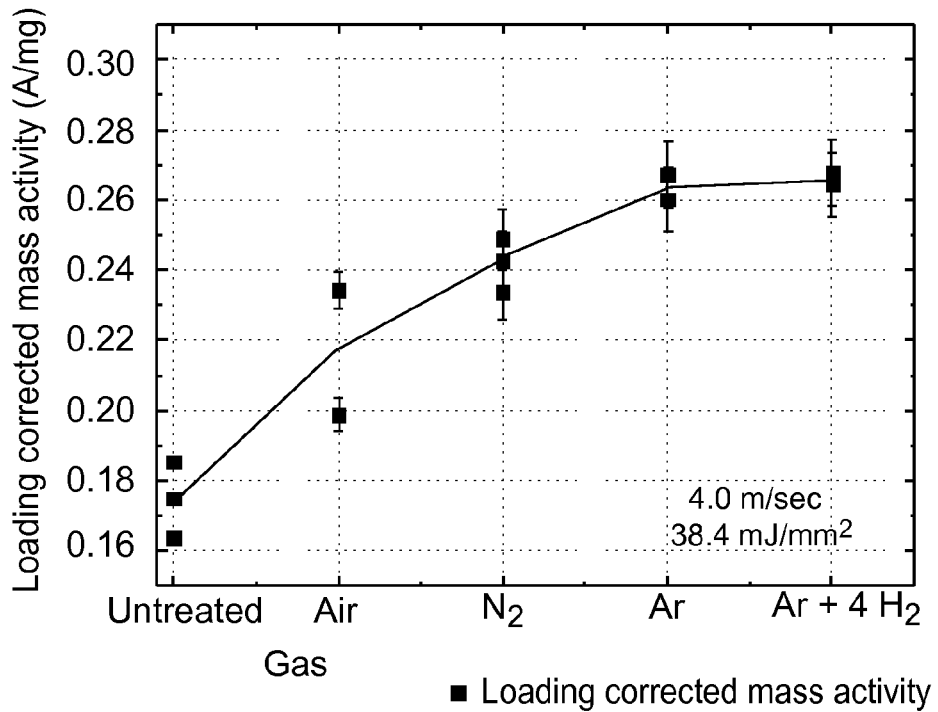
FIGS. 6A and 6B are graphs of mass activity vs. gas type and fluence, as discussed in Example 2.
Figure 6B:
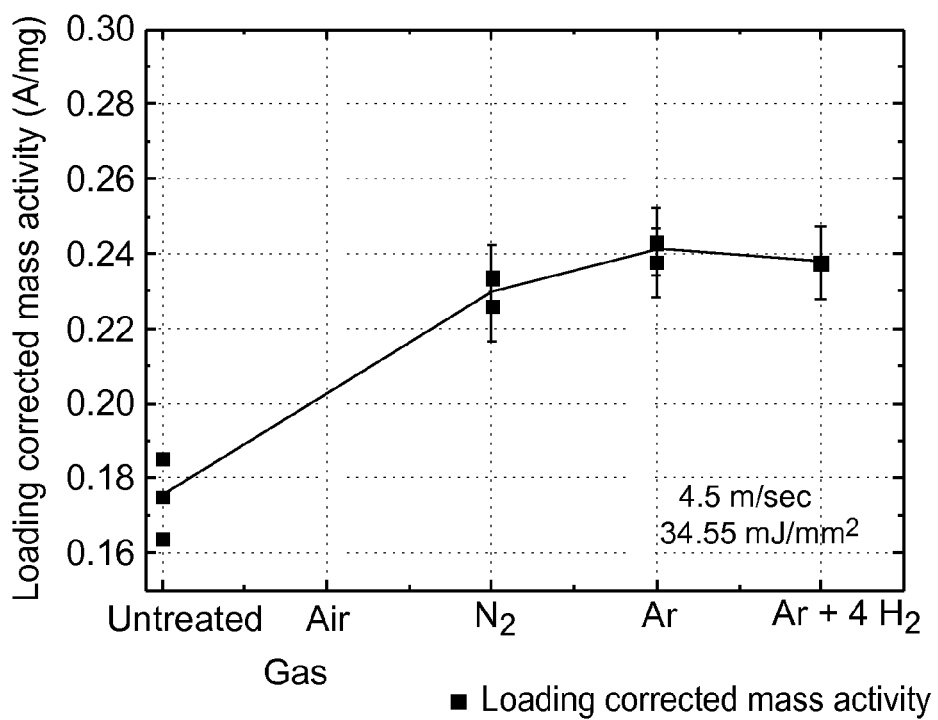

FIG. 6 shows the measured mass activity from the set #4 samples as a function of the gas type for the two fluence levels. The loading corrected mass activity means the absolute activity was divided by the XRF determined mass loading from FIG. 5. The error bars reflect a 1 sigma standard deviation of the XRF loading measurement. 4 m/sec (38.4 mJ/mm$^2$) is more effective than 4.5 m/sec (34.55 mJ/mm$^2$). It is apparent in FIG. 6 that treatment in air is less effective than in inert gases, Ar appears more effective than N$_2$ which is more effective than air. The presence of 4% H$_2$ does not appear to provide any benefit over pure Ar. A maximum gain in mass activity of ~50% is obtained by the laser treatment under Ar or Ar+4% H$_2$ at 4 m/sec.

Figure 7A:
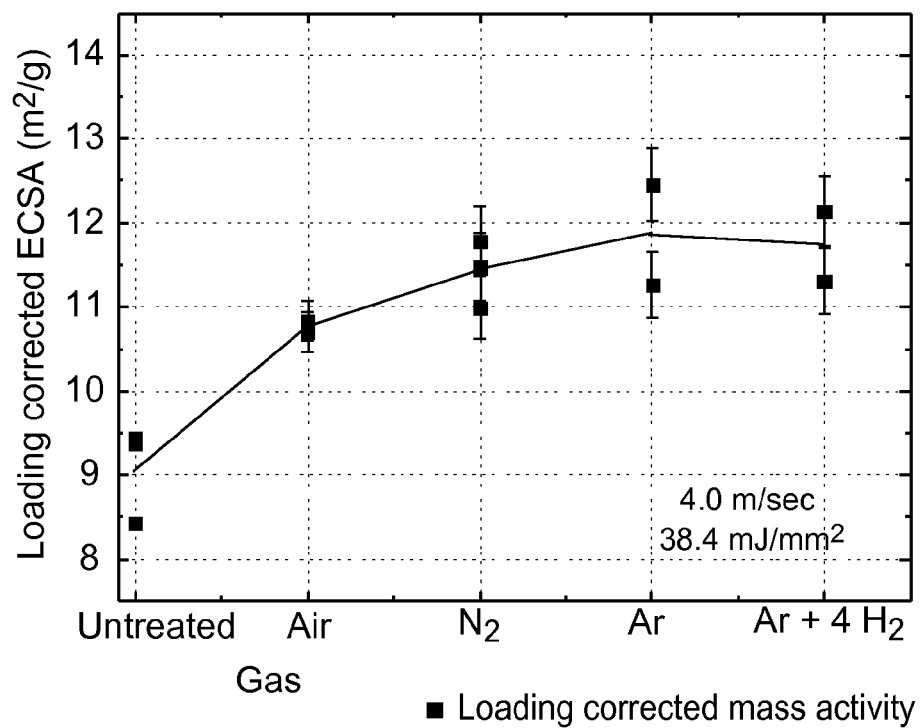
FIGS. 7A and 7B are graphs of mass specific surface area vs. gas type and fluence, as discussed in Example 2.
Figure 7B:
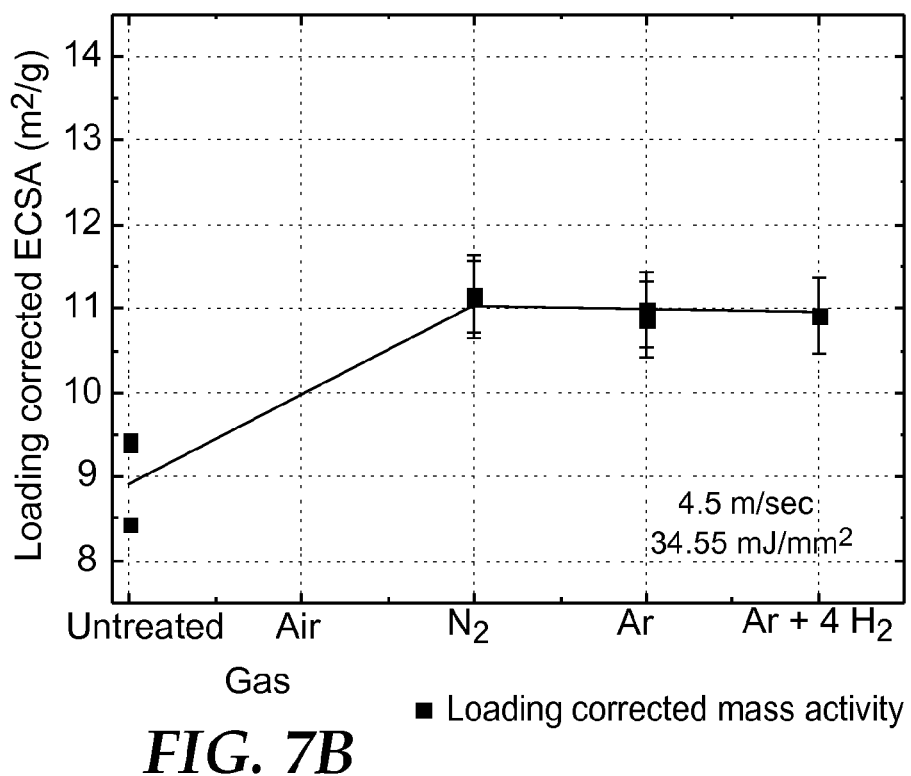

FIG. 7 shows similarly the loading corrected mass specific surface area for laser set #4 as a function of the gas type and fluence. Similar to the mass activity, 4 m/sec (38.4 mJ/mm$^2$) was more effective than 4.5 m/sec (34.55 mJ/mm$^2$), treatment in air is less effective than in inert gases, Ar appears more effective than N$_2$ which is more effective than air, and the presence of 4% H$_2$ does not appear to provide any benefit over pure Ar. A maximum gain in ECSA of ~25-30% was obtained by the laser treatment.

Figure 8A:
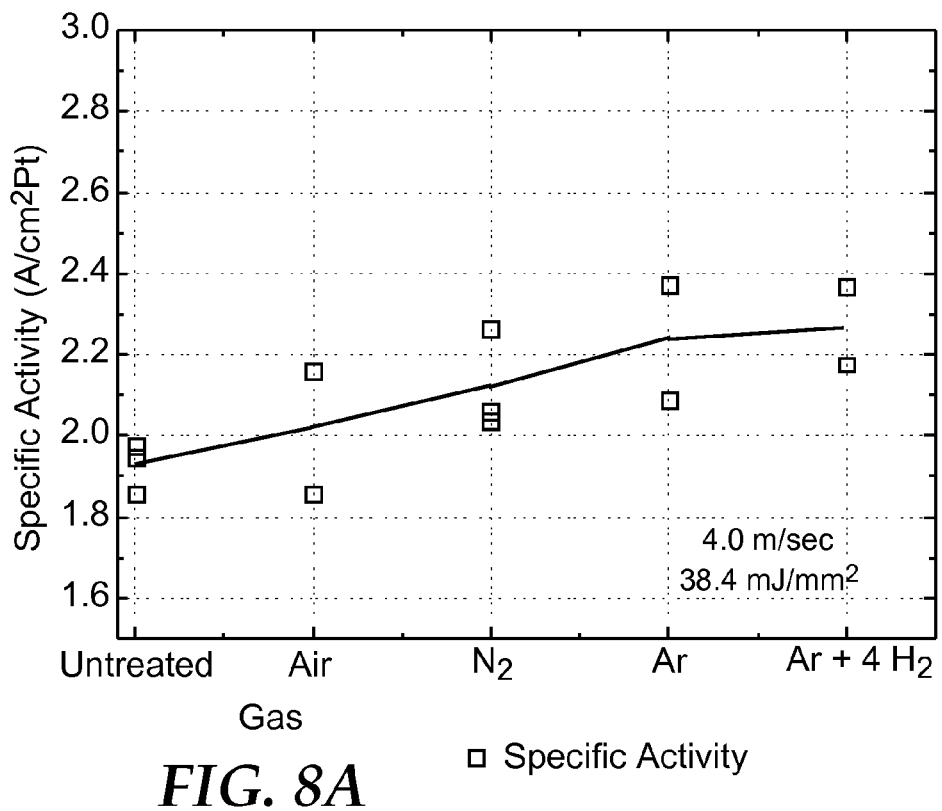
FIGS. 8A and 8B are graphs of specific activity vs. gas type and fluence, as discussed in Example 2.
Figure 8B:
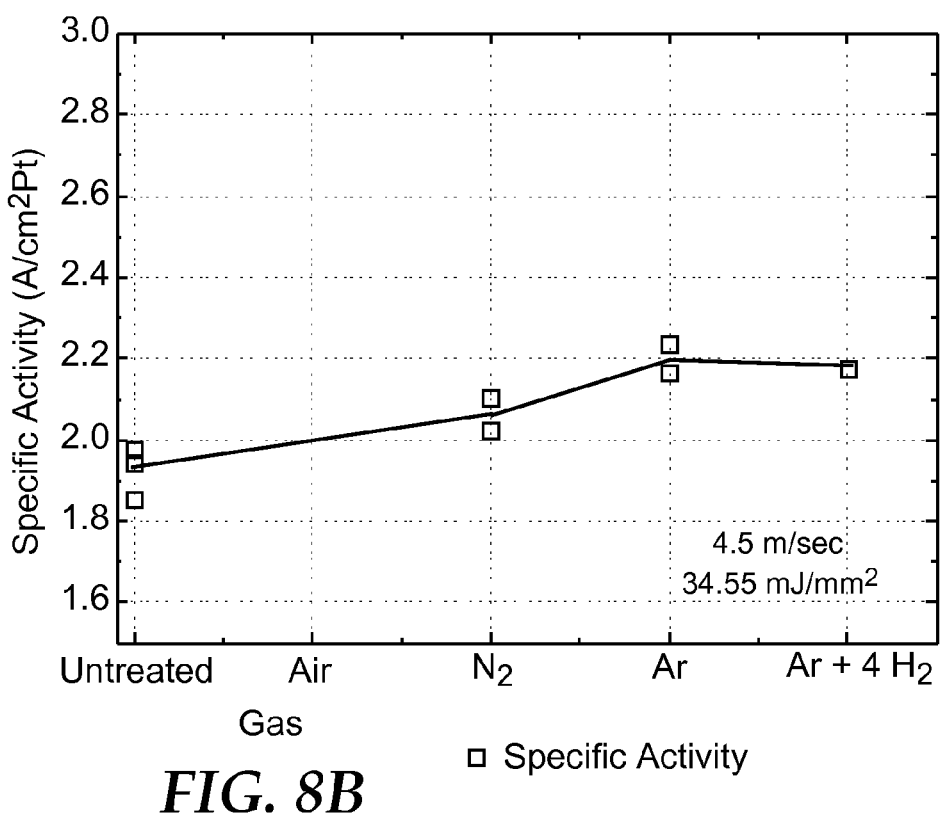

FIG. 8 shows the specific activity (A/cm$^2$ of Pt surface area) vs. gas type and fluence for laser set #4. Similar to mass activity and specific surface area, 4 m/sec (38.4 mJ/mm$^2$) is more effective than 4.5 m/sec (34.55 mJ/mm$^2$), treatment in air is less effective than in inert gases, Ar appears more effective than N$_2$ which is more effective than air, and the presence of 4% H$_2$ does not appear to provide any benefit over pure Ar. A maximum gain in Specific Activity of ~18% is obtained by the laser treatment at the highest fluence level.

Figure 9C:
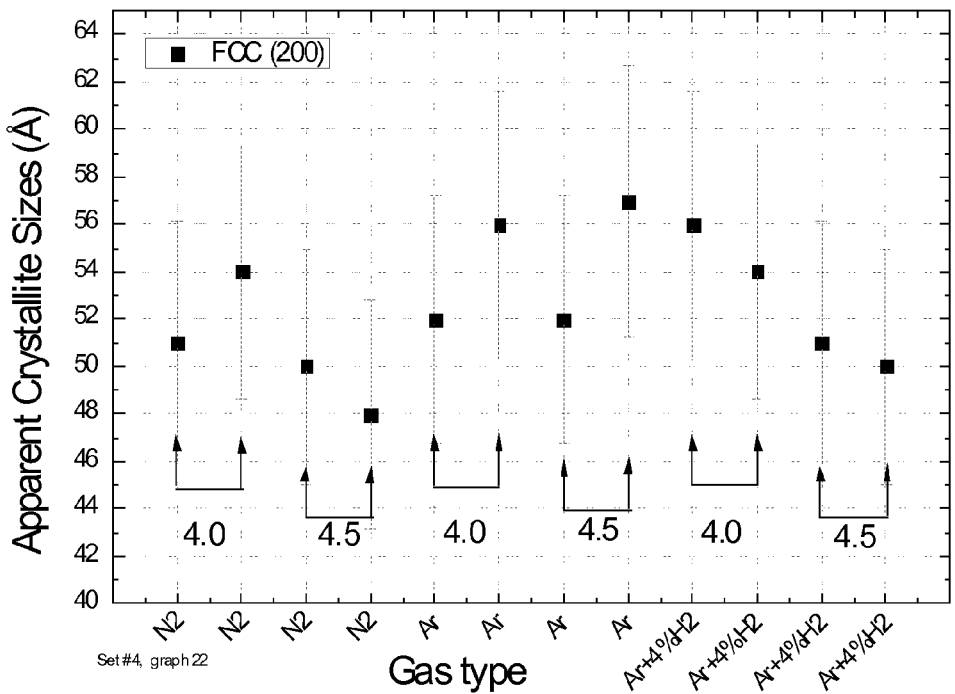
Figure 9D:
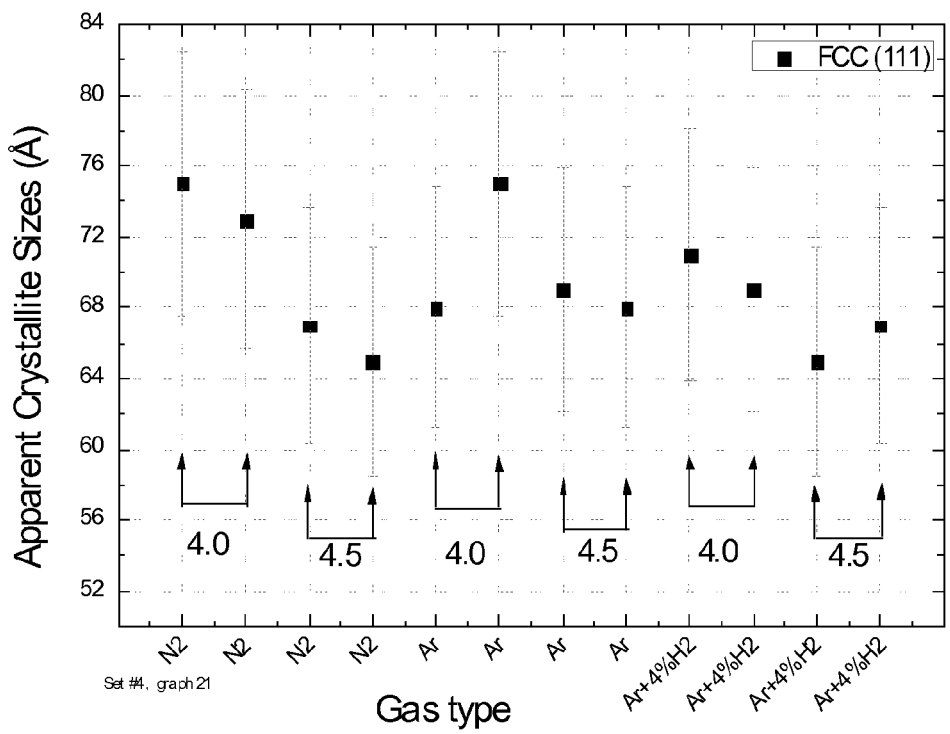

Finally, FIG. 9 shows the Pt grain sizes in the [hkl] directions and the lattice constants for the samples of laser set #4. There appeared to be a consistent trend that the higher fluence (4 m/sec scan rate) generated slightly higher grain sizes than the 4.5 m/sec rate. It is not clear if there is a consistent gas type dependence.

Example 3

In this example a series of thirty-six samples from set #5 were exposed under controlled ambient gases with the catalyst type, laser scan rate, gas type, and residual O$_2$ levels identified in Table III.

TABLE III

Sample parameters for laser annealing set 5.

| Sample # | Catalyst Lot | Catalyst Type | Gas (100 slm) | Scan Rate (m/sec) | Residual Oxygen at start of scan (ppm) | Residual Oxygen at end of scan (ppm) |
|---|---|---|---|---|---|---|
| 5-1 | P409272 | PtCoMn | air | 4 | NA | NA |
| 5-2 | P409272 | PtCoMn | air | 4.5 | NA | NA |
| 5-3 | P409272 | PtCoMn | He | 4.5 | 35 | |
| 5-4 | P409272 | PtCoMn | He | 4 | 52 | 38 |
| 5-5 | P409272 | PtCoMn | He + 4% H2 | 4.5 | 38 | NA |
| 5-6 | P409272 | PtCoMn | He + 4% H2 | 4 | 38 | NA |
| 5-7 | P4D09308A | PtNi(0.6) | air | 4.5 | NA | NA |
| 5-8 | P4D09308A | PtNi(0.6) | air | 4.5 | NA | NA |
| 5-9 | P4D09308A | PtNi(0.6) | N$_2$ | 4 | 39 | 10 |
| 5-10 | P4D09308A | PtNi(0.6) | N$_2$ | 4.5 | 41 | 28 |
| 5-11 | P4D09308A | PtNi(0.6) | Ar/ 4% H2 | 4.5 | 40 | NA |
| 5-12 | P4D09308A | PtNi(0.6) | Ar/ 4% H2 | 4.5 | 38 | NA |
| 5-13 | P4D09308A | PtNi(0.6) | He + 4% H2 | 4.5 | 39 | NA |
| 5-14 | P4D09308A | PtNi(0.6) | He + 4% H2 | 4.5 | 39 | NA |
| 5-15 | P4D09308B | PtNi(4.2) | air | 4.5 | NA | NA |
| 5-16 | P4D09308B | PtNi(4.2) | air | 4.5 | NA | NA |
| 5-17 | P4D09308B | PtNi(4.2) | N$_2$ | 4.5 | 39 | 30 |
| 5-18 | P4D09308B | PtNi(4.2) | N$_2$ | 4.5 | 39 | 28 |
| 5-19 | P4D09308B | PtNi(4.2) | Ar/ 4% H2 | 4.5 | 38 | NA |
| 5-20 | P4D09308B | PtNi(4.2) | Ar/ 4% H2 | 4.5 | 39 | NA |
| 5-21 | P4D09308B | PtNi(4.2) | He + 4% H2 | 4.5 | 26 | NA |
| 5-22 | P4D09308B | PtNi(4.2) | He + 4% H2 | 4.5 | 30 | NA |
| 5-23 | ML091109-1 | PtNi(0.6) | He + 4% H2 | 4.5 | 32 | NA |
| 5-24 | ML091109-1 | PtNi(0.6) | He + 4% H2 | 4.5 | 33 | NA |
| 5-25 | ML091117-1 | PtCo(0.45) | Ar | 4.5 | 53 | 48 |
| 5-26 | ML091117-1 | PtCo(0.45) | Ar | 4.5 | 52 | 45 |

TABLE III-continued

Sample parameters for laser annealing set 5.

| Sample # | Catalyst Lot | Catalyst Type | Gas (100 slm) | Scan Rate (m/sec) | Residual Oxygen at start of scan (ppm) | Residual Oxygen at end of scan (ppm) |
|---|---|---|---|---|---|---|
| 5-27 | ML091117-1 | PtCo(0.45) | Ar | 4.5 | 54 | 45 |
| 5-28 | ML091117-1 | PtCo(0.45) | Ar | 4 | 54 | 28 |
| 5-29 | ML091117-1 | PtCo(0.45) | Ar | 4 | 53 | 29 |
| 5-30 | ML091117-1 | PtCo(0.45) | Ar | 4 | 54 | 29 |
| 5-31 | P4D09308A | PtNi(0.6) | Ar | 4.5 | 54 | 44 |
| 5-32 | P4D09308A | PtNi(0.6) | Ar | 4.5 | 53 | 43 |
| 5-33 | P4D09308A | PtNi(0.6) | Ar | 4 | 49 | 24 |
| 5-34 | P4D09308A | PtNi(0.6) | Ar | 4 | 53 | 27 |
| 5-35 | P4D09308A | PtNi(0.6) | Ar | 4.5 | 54 | 48 |
| 5-36 | P4D09308A | PtNi(0.6) | Ar | 4 | 54 | 30 |

Figure 10:
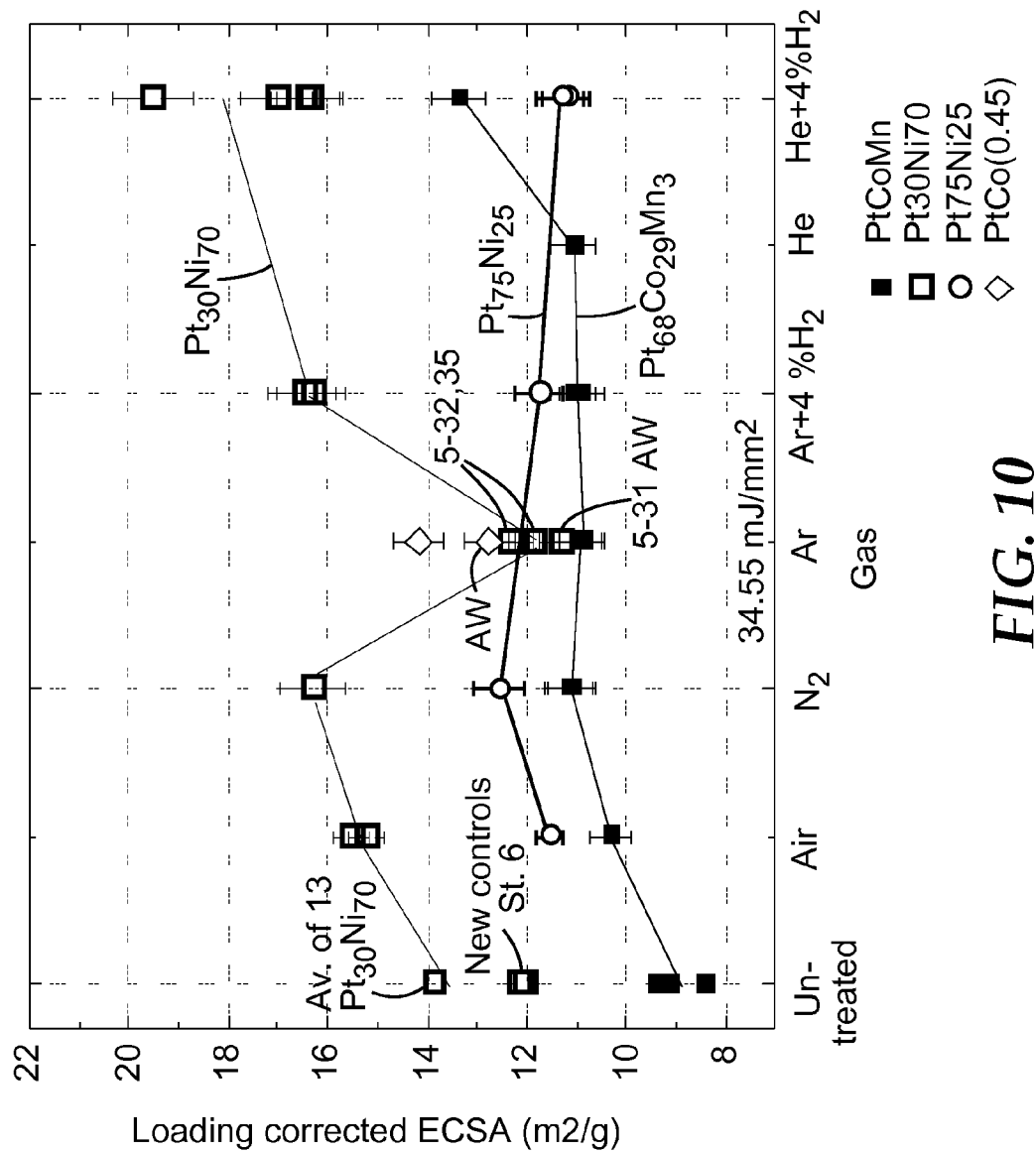
FIG. 10 is a graph of mass specific surface area vs. gas type for four catalyst types, as discussed in Example 3.
Figure 11:
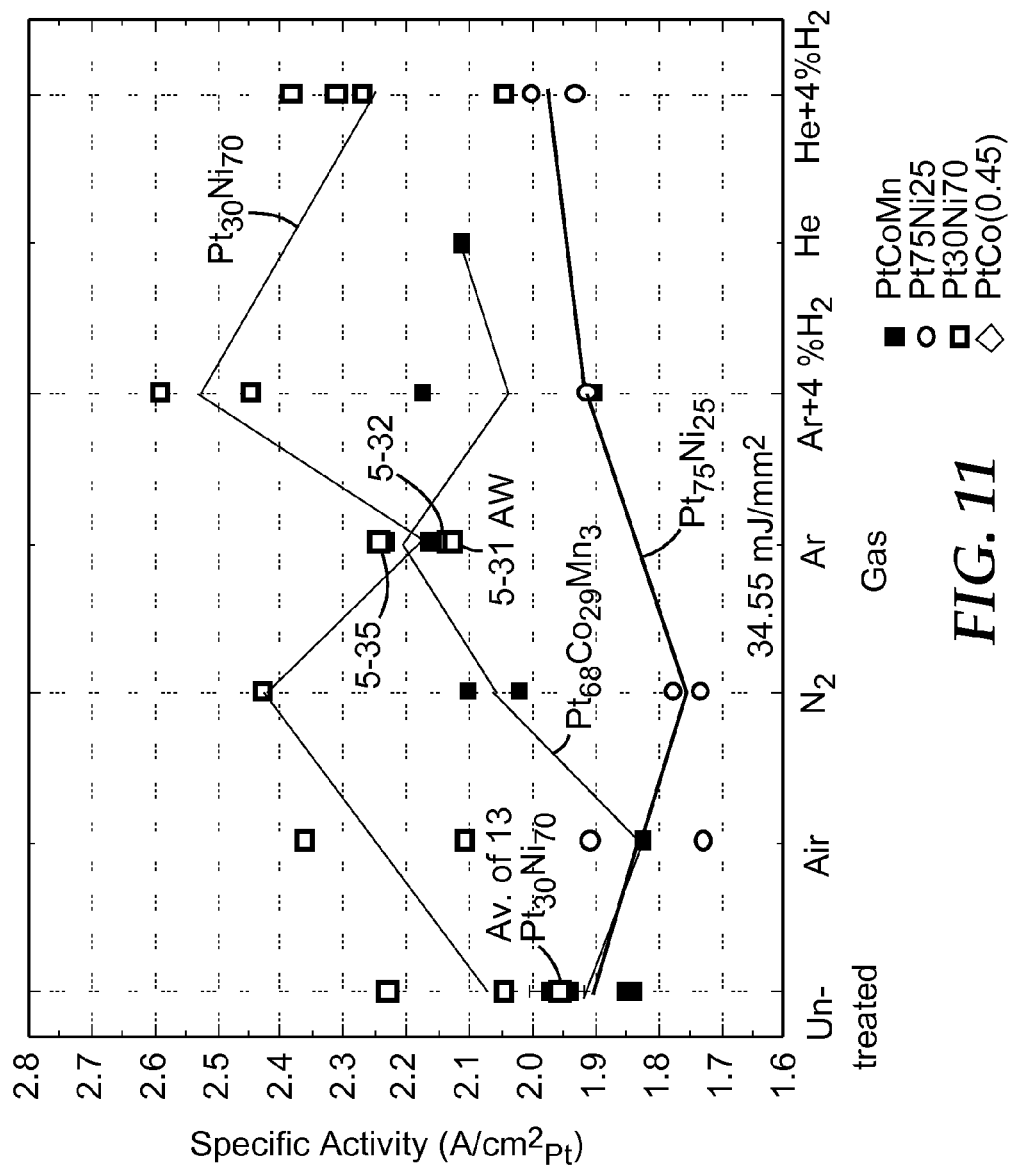
FIG. 11 is a graph of specific activity vs. gas type for four catalyst types, as discussed in Example 3.
Figure 12:
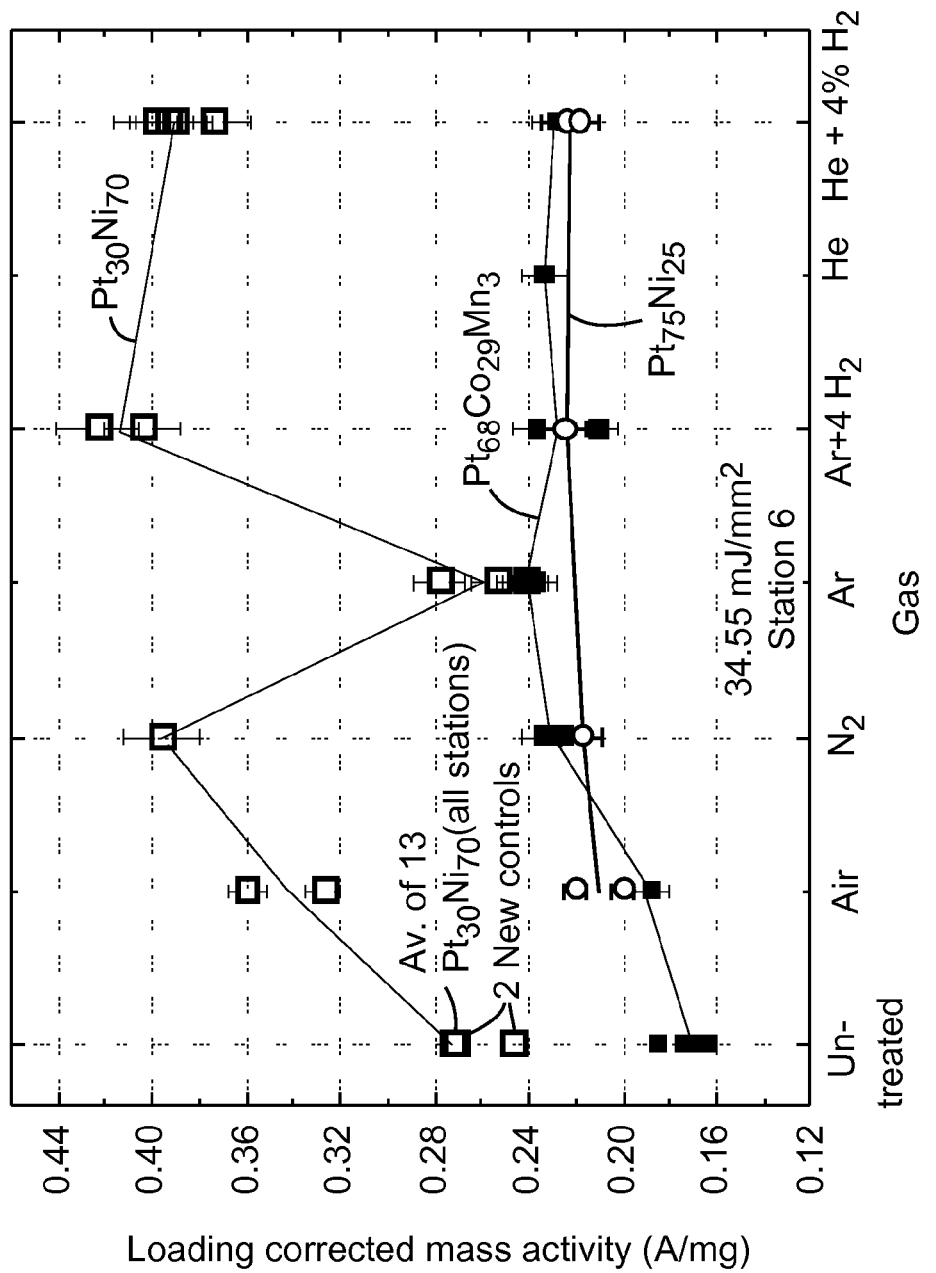
FIG. 12 is a graph of mass activity vs. gas type for four catalyst types, as discussed in Example 3.

For comparison to earlier examples, laser scan rates of 4 m/sec correspond to fluences of 38.4 mJ/mm$^2$ and 4.5 m/sec to 34.55 mJ/mm$^2$. FIGS. 10-12 summarize the resulting effect of the laser annealing on the catalyst activity metrics for the four types of catalyst compositions under the various gases at atmospheric pressure.

FIG. 10 shows that the laser treatment with a fluence of 34.5 mJ/mm$^2$ under all gases increased the surface area of all the catalyst types. It shows also that treatment of the high Ni containing Pt$_{30}$Ni$_{70}$ catalyst under the inert gases containing some H$_2$ increased the surface area substantially more than treatment under air for the inert gases, while the effect under the inert or inert+hydrogen gases was much less for the higher Pt containing catalysts.

FIG. 11 shows that the specific activity for oxygen reduction was increased by as much as 25% over the untreated Pt$_{30}$Ni$_{70}$ catalyst under Ar+4% H$_2$ by the laser annealing at atmospheric pressure. The other catalyst compositions showed lesser amounts of increases over the as-made, untreated condition.

FIG. 12 shows that the high Ni containing catalyst's mass activity was increased by as much as 50% over the untreated control by the laser treatment under the inert gases containing some hydrogen. The low Ni containing catalyst, Pt$_{75}$Ni$_{25}$, was not increased as much. The mass activity is the product of the mass specific surface area (FIG. 10) and the specific activity (FIG. 11), and so the percentage increases in both of those quantities combines to give the larger increase in this mass activity.

Example 4

In this example a series of samples from set #6 were exposed under a sub-atmospheric pressure of a mixture of Ar+4% H$_2$ or N$_2$+4% H$_2$. The catalyst types and loadings of Pt, are identified in Table 4.1. For these exposures, the chamber shown in FIG. 2 was replaced with a vacuum chamber. The gaseous environment within the chamber was determined by the rate of inlet gas flow and the rate of pumping by a standard mechanical vacuum pump. The gaseous pressure was measured with a diaphragm vacuum gauge so it was independent of the gas type. The incident laser was introduced through a ZnSe window at the top of the chamber. For these samples of set #6, the gas inlet and outlet pump throttle valves were adjusted to maintain a steady pressure, e.g.10 ton to 750 Ton, in the chamber during the laser scan over the 50 cm$^2$ area of the sample. A major reason for using a subatmospheric gas pressure is to affect the rate of cooling of the catalyst areas heated by the passing laser beam. For these samples, the scan rate of the laser and the laser power was varied as well.

TABLE 4.I

LASER annealed sample Set #6.

Vacuum Conditions: 10 Torr with dynamic flow of Ar + 4% H$_2$
Laser Conditions

| scan rate = 4 m/sec | 250 micron spot size | 0.25 mm hatch | 20 kHz | 30 microsec. | Pen 1 | | | |
|---|---|---|---|---|---|---|---|---|

| Sample # | Catalyst Lot | Catalyst Type | Gas Flowing at 10 Torr | Scan Rate (m/sec) | Pt Loading | Beam Power | Pressure (Torr) | Number Passes |
|---|---|---|---|---|---|---|---|---|
| LASER Sample Set #6 | | | | | 22 Mar. 2010 | | | |
| 6-1 | P409272 | PtCoMn | Ar + 4% H2 | 4 | 0.1 | 33% | 10 | 1 |
| 6-2 | P409272 | PtCoMn | Ar + 4% H2 | 4 | 0.1 | 33% | 10 | 1 |
| 6-3 | P409272 | PtCoMn | Ar + 4% H2 | 4 | 0.1 | 33% | 10 | 1 |
| 6-4 | P410061A | Pt3Ni7 | Ar + 4% H2 | 4 | 0.1 | 33% | 10 | 1 |
| 6-5 | P410061A | Pt3Ni7 | Ar + 4% H2 | 4 | 0.1 | 33% | 10 | 1 |
| 6-6 | P410061A | Pt3Ni7 | Ar + 4% H2 | 4 | 0.1 | 33% | 10 | 1 |
| 6-7 | P1X100126 | Pt on +40 C. | Ar + 4% H2 | 4 | 0.15 | 33% | 10 | 1 |
| 6-8 | P1X100126 | Pt on +40 C. | Ar + 4% H2 | 4 | 0.15 | 33% | 10 | 1 |
| 6-9 | P1X100126 | Pt on +40 C. | Ar + 4% H2 | 4 | 0.15 | 33% | 10 | 1 |
| 2nd set | | | | | 13 Apr. 2010 | | | |
| 6-10 | P410061A | Pt$_3$Ni$_7$ | Ar + 4% H2 | 4 | 0.1 | 33% | 750 | 1 |
| 6-11 | P410061A | Pt$_3$Ni$_7$ | Ar + 4% H2 | 4 | 0.1 | 33% | 750 | 1 |
| 6-12 | P410061A | Pt$_3$Ni$_7$ | Ar + 4% H2 | 4 | 0.1 | 33% | 330 | 1 |
| 6-13 | P410061A | Pt$_3$Ni$_7$ | Ar + 4% H2 | 4 | 0.1 | 33% | 330 | 1 |
| 6-14 | P410061A | Pt$_3$Ni$_7$ | Ar + 4% H2 | 4 | 0.1 | 33% | 100 | 1 |
| 6-15 | P410061A | Pt$_3$Ni$_7$ | Ar + 4% H2 | 4 | 0.1 | 33% | 100 | 1 |
| 6-16 | P410061A | Pt$_3$Ni$_7$ | Ar + 4% H2 | 4 | 0.1 | 33% | 32 | 1 |
| 6-17 | P410061A | Pt$_3$Ni$_7$ | Ar + 4% H2 | 4 | 0.1 | 33% | 33 | 1 |
| 6-18 | P410061A | Pt$_3$Ni$_7$ | Ar + 4% H2 | 4 | 0.1 | 33% | 750 | 2 |
| 6-19 | P410061A | Pt$_3$Ni$_7$ | Ar + 4% H2 | 4 | 0.1 | 33% | 750 | 2 |
| 6-20 | P410061A | Pt$_3$Ni$_7$ | Ar + 4% H2 | 4 | 0.1 | 33% | 750 | 4 |

TABLE 4.I-continued

| | | LASER annealed sample Set #6. | | | | | | |
|---|---|---|---|---|---|---|---|---|
| 6-21 | P410061A | $Pt_3Ni_7$ | Ar + 4% H2 | 4 | 0.1 | 33% | 750 | 4 |
| | 3rd set | | | | 16 Apr. 2010 | | | |
| 6-22 | P410061A | $Pt_3Ni_7$ | $N_2$ + 4% $H_2$ | 3.8 | 0.1 | 33% | 600 | 1 |
| 6-23 | P410061A | $Pt_3Ni_7$ | $N_2$ + 4% $H_2$ | 3.6 | 0.1 | 33% | 600 | 1 |
| 6-24 | P410061A | $Pt_3Ni_7$ | $N_2$ + 4% $H_2$ | 4.5 | 0.1 | 60% | 600 | 1 |
| 6-25 | P410061A | $Pt_3Ni_7$ | $N_2$ + 4% $H_2$ | 4.5 | 0.1 | 55% | 600 | 1 |
| 6-26** | P410061A | $Pt_3Ni_7$ | $N_2$ + 4% $H_2$ | 4.5 | 0.1 | 55% | 600 | 1 |
| 6-27 | P410061A | $Pt_3Ni_7$ | $N_2$ + 4% $H_2$ | 4.5 | 0.1 | 55% | 600 | 1 |

**Inadvertently laser exposed with MCTS grooves perpendicular to scan direction. So rotated sampled 90° and re-exposed again. Very little indication of exposure after 1st scan with grooves perpendicular.

Figure 13A:
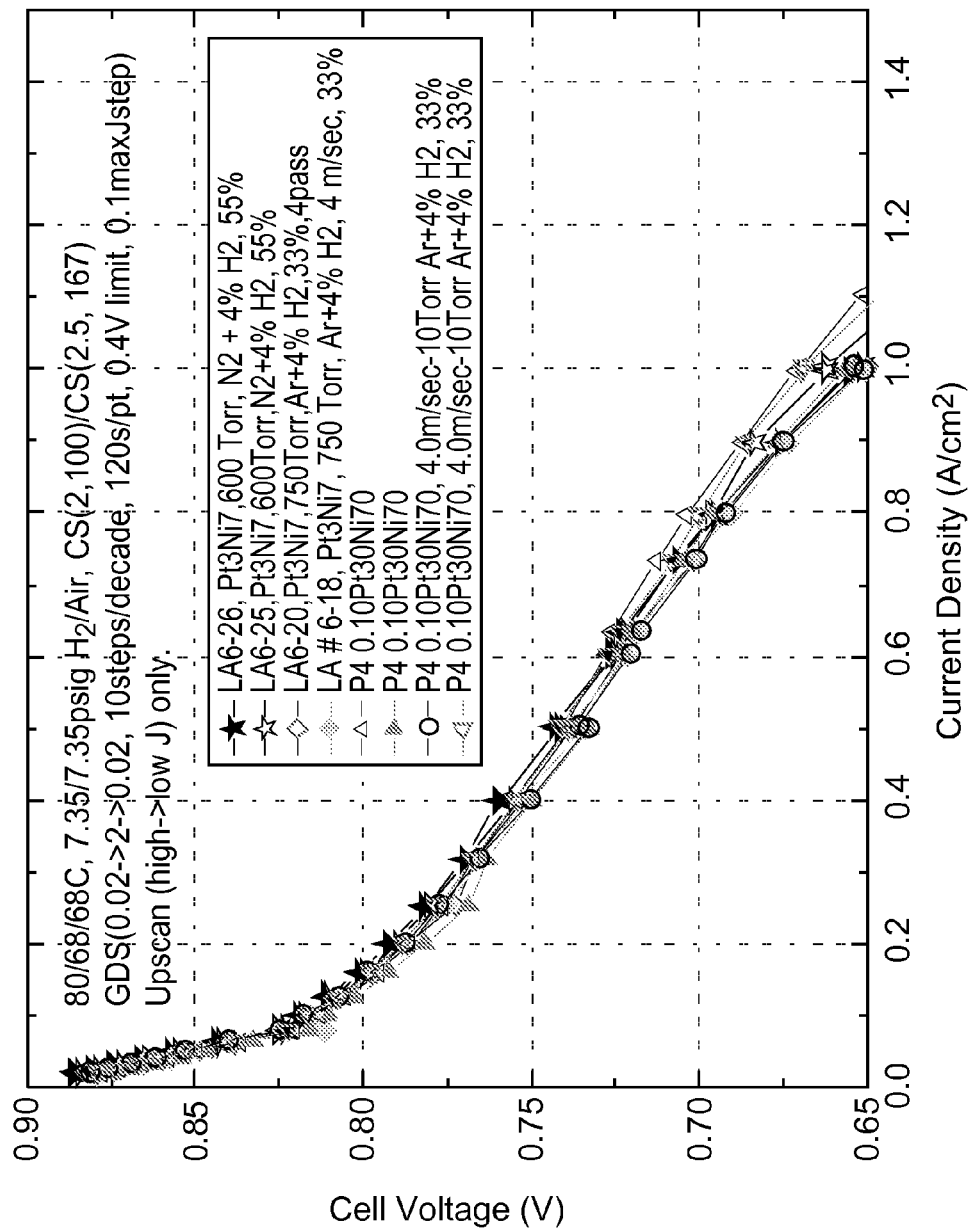
FIG. 13A represents galvanodynamic polarization curves in the kinetic and mid-current density regions from catalyst samples made with $Pt_{30}Ni_{70}$ as discussed in Example 4.
Figure 13B:
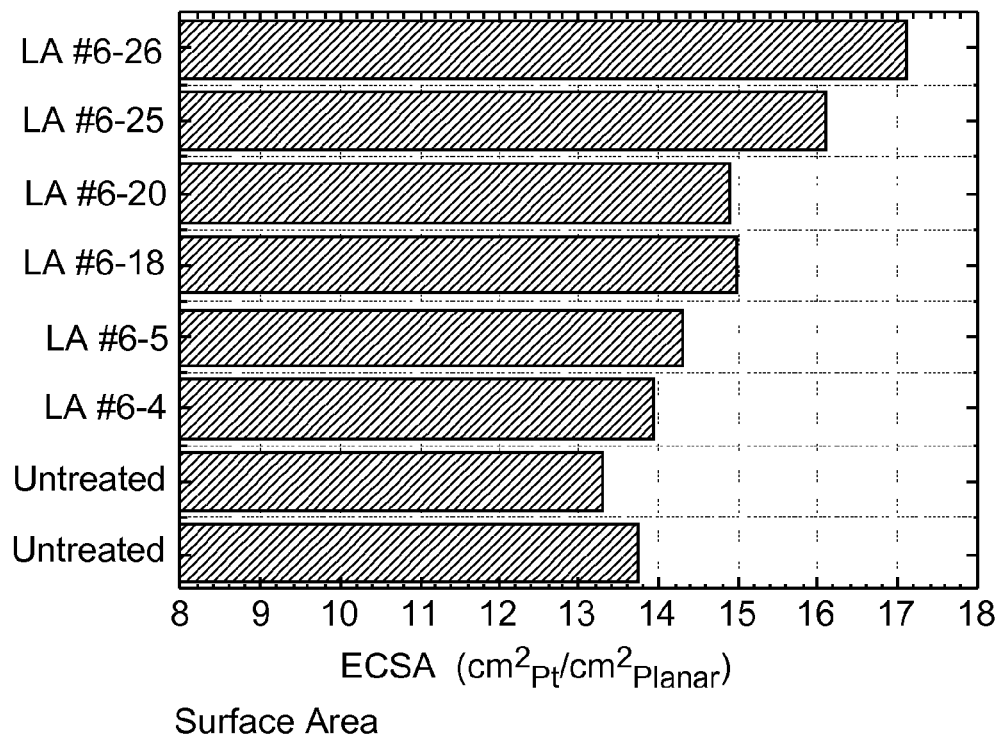
FIGS. 13B to 13E compare ORR metrics for three sample types and untreated controls as discussed in Example 4.
Figure 13C:
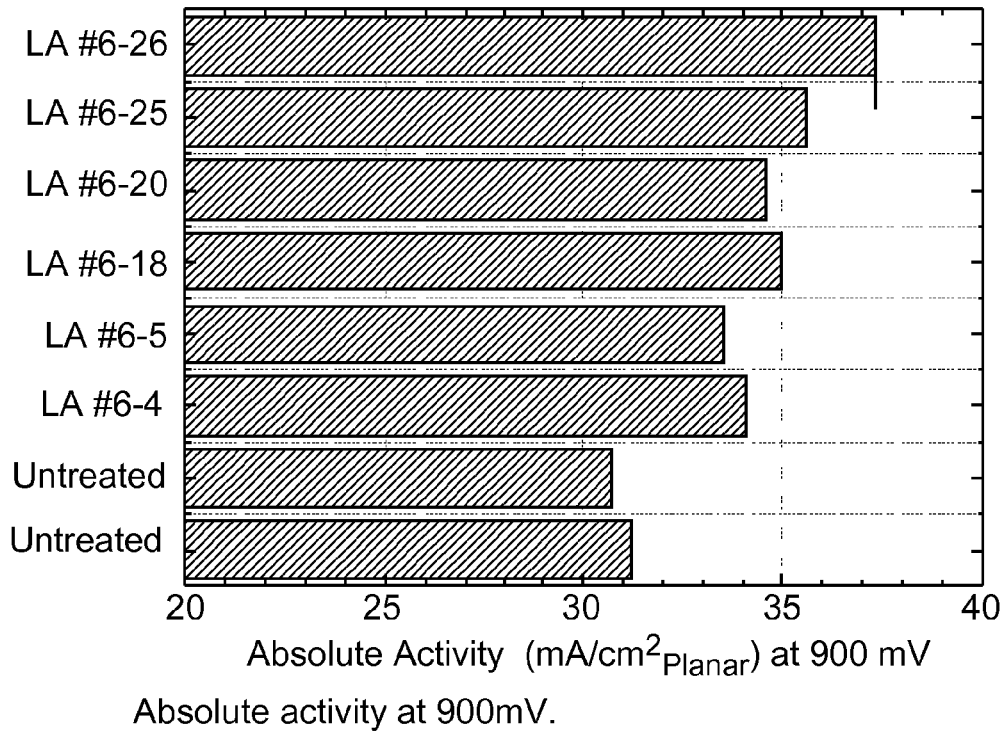
Figure 13D:
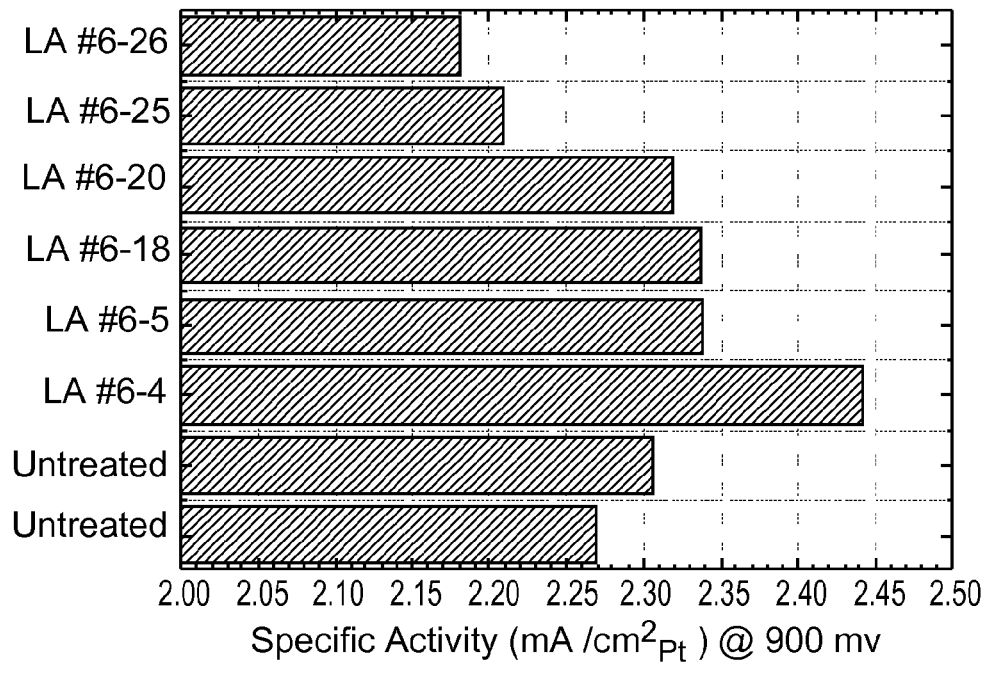

FIG. 13A shows only slight differences in the fuel cell polarization curves in the kinetic region and mid-current density region for the samples shown. FIGS. 13B to 13E compare more specific ORR metrics for three sample types with the untreated controls. It is apparent in FIGS. 13B to 13E that LA6-25 had the highest mass activity and surface area as a result of the laser annealing conditions used.

Figure 13E:
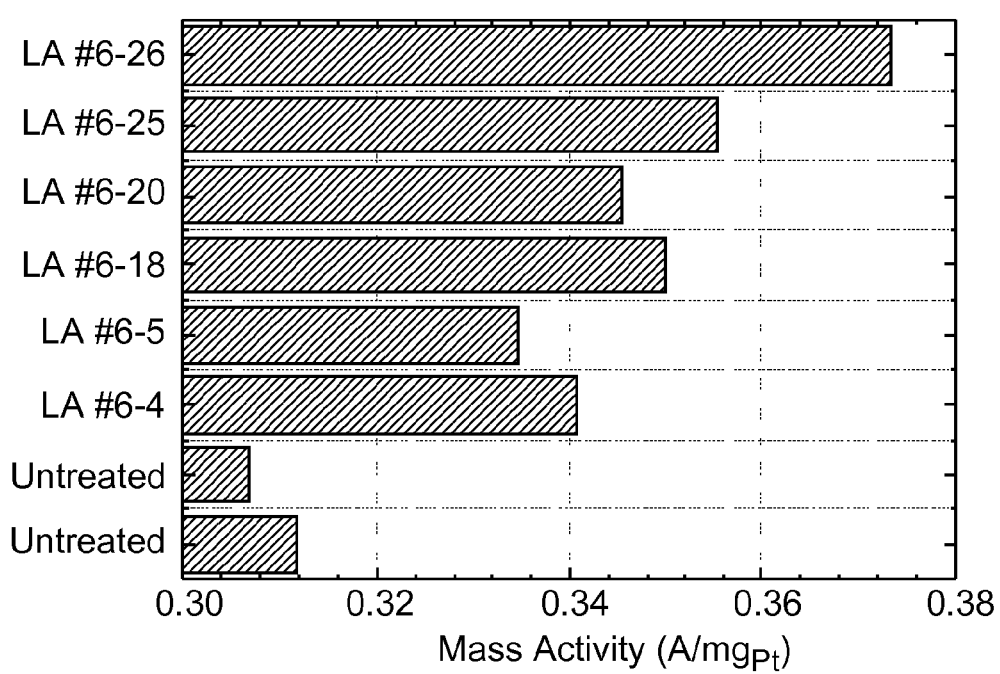

FIG. 13E shows that the sample exposed under N2+4% H2 at 600 Ton total pressure (80 kPa) with 55% laser power at 4.5 m/sec scan rate has the highest increase in mass activity.

Example 5

In this example, a series of fuel cell NSTF catalysts were exposed to an electron beam as a way to post-treat the catalysts with energy. For these samples PtCoMn catalysts with a 0.1 mg/cm$^2$ Pt loading coated onto the NSTF whiskers as in previous examples were used. The 3M CRPL e-beam processing line designated at CB300 was used to expose the samples:

Sample: Catalyst roll PE4145B—PtCoMn (90:10, 20, 2, 1, 0.15 $mg_{Pt}$/cm$^2$)

TABLE 5-I

Samples Exposed in the CB 300

| Sample # | Size | Web Speed | Beam Voltage | Beam Current | Dosage (Mrad) | Number of Passes |
|---|---|---|---|---|---|---|
| 1 | 4" × 11" | 20 ft/min | 120 keV | 15 mA | 14.5 | 1 |
| 2 | 6" × 11" | 10 ft/min | 120 keV | 7.5 mA | 15.5 | 1 |
| 3 | 13" × 11" | 20 ft/min | 120 keV | 15 mA | 14.3 | 5 |

Figure 14A:
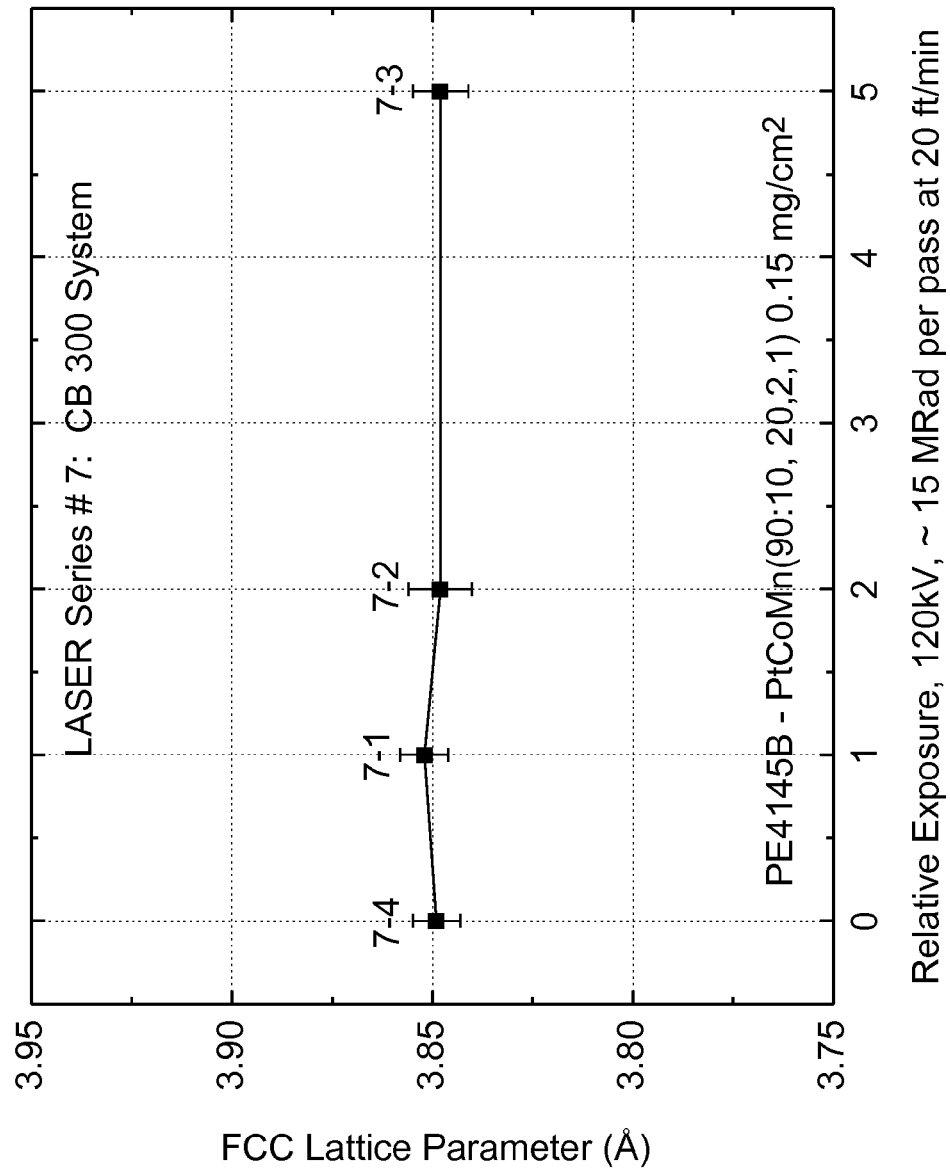
FIG. 14A is a chart of the Pt face centered cubic (111) lattice parameter of PtCoMn alloy catalyst as a function of electron beam radiation exposure, as deduced from X-ray diffraction, for samples discussed in Example 5.
Figure 14B:
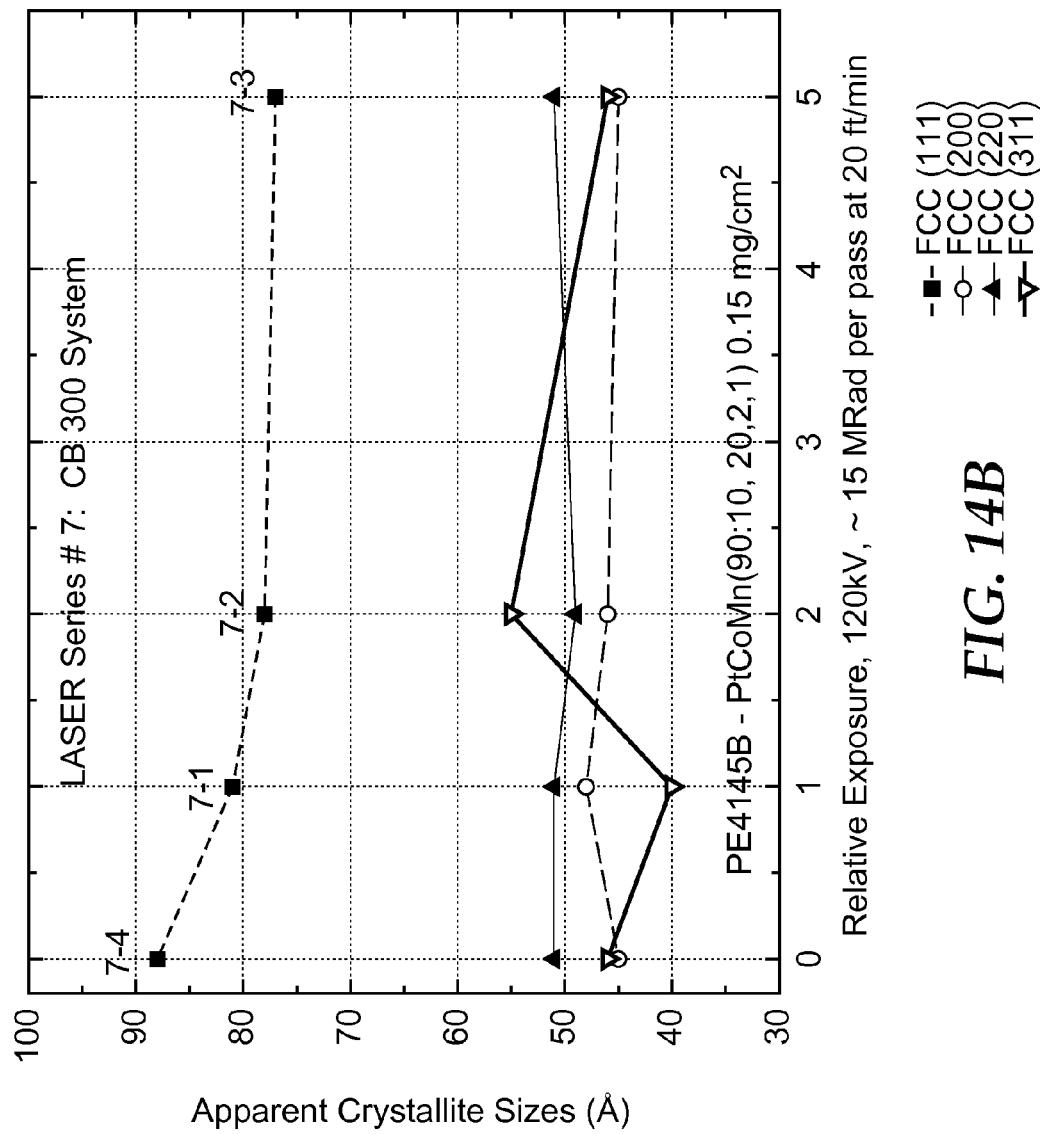
FIG. 14B is a chart demonstrating variation of Pt fcc[111] crystallite size of PtCoMn alloy catalyst as a function of electron beam radiation exposure, as deduced from X-ray diffraction, for samples discussed in Example 5.

There was no visible effect on the samples from any of the exposures, although they felt slightly warmer when removed from the carrier web. Samples were submitted for X-ray diffraction characterization to see if there is any change in grain size or lattice parameter, with the results shown in FIGS. 14A and 14B. FIG. 14A is a chart of the Pt face centered cubic (111) lattice parameter of PtCoMn alloy catalyst as a function of electron beam radiation exposure, as deduced from X-ray diffraction. FIG. 14B is a chart disclosing variation of Pt fcc[111] crystallite size of PtCoMn alloy catalyst as a function of electron beam radiation exposure, as deduced from X-ray diffraction.

FIG. 14A shows that the lattice parameter of the catalyst was unchanged by the e-beam radiation exposure. FIG. 14B shows that the Pt crystallite grain size in the Pt[111] direction decreased with increasing radiation exposure. However there was no systematic change in the crystallite sizes in the Pt(200), Pt(220), or Pt(311) directions. This indicates that the crystallites have an aspect ratio greater than one in the [111] direction and the effect of the e-beam treatment was to decrease the aspect ratio slightly.

Figure 14C:
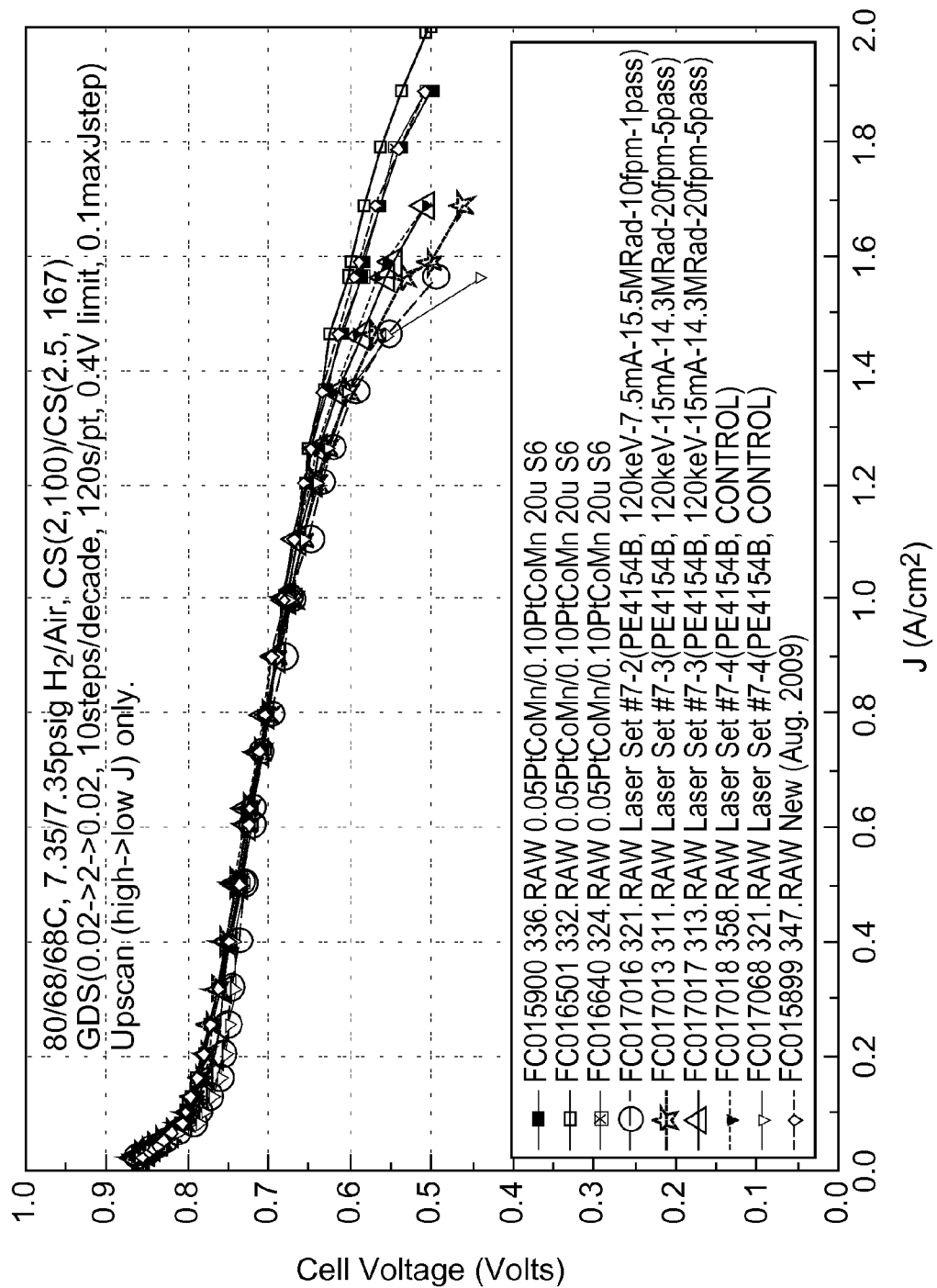
FIG. 14C represents galvanodynamic polarization curves for catalyst samples discussed in Example 5.

Fuel cell membrane electrode assemblies (MEA's) were made from samples 2, 3 and a control (untreated) for fuel cell characterization. FIG. 14C compares the galvanodynamic polarization curves from duplicates of the samples 7-2 and 7-3 in Table 5.1, as well as untreated controls designated at samples 7-4. Other comparison MEA's are included as well. The fuel cell performance was seen to be essentially the same for these three types.

Figures 1, 14D:
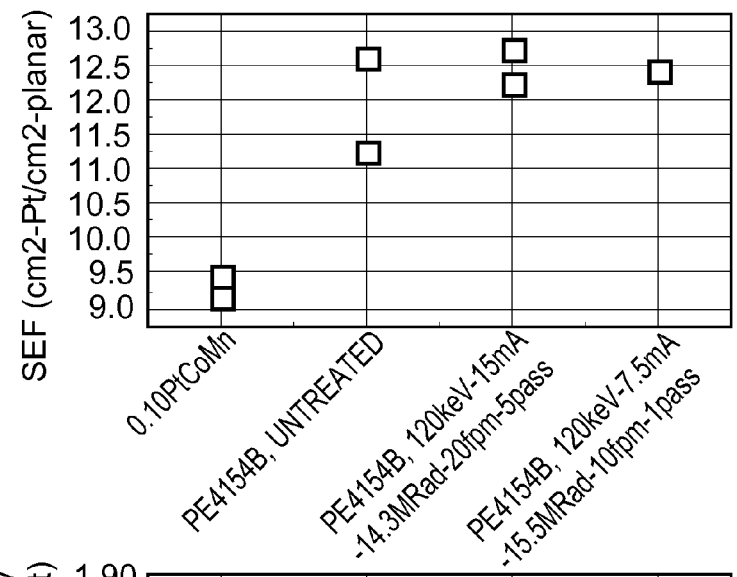
FIG. 14D represents oxygen reduction reaction (ORR) fuel cell metrics measured for catalyst samples discussed in Example 5.
Figures 2, 14D:
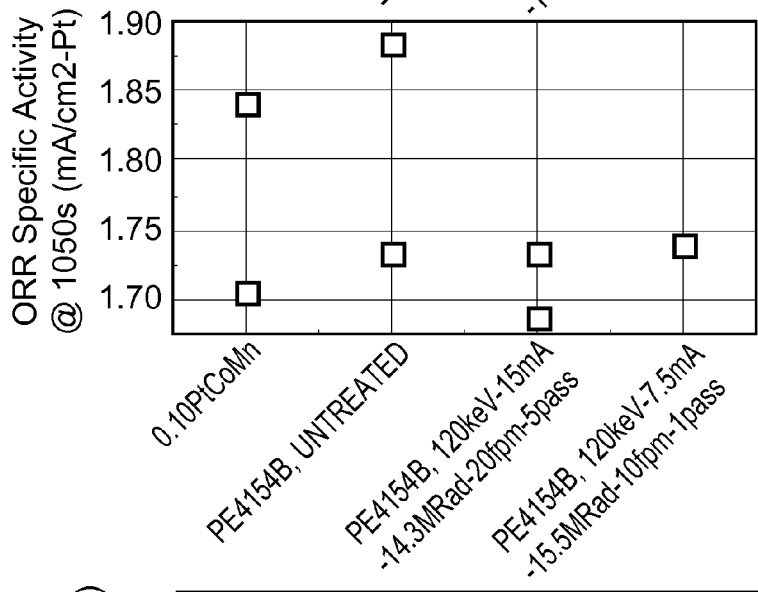
Figures 3, 14D:
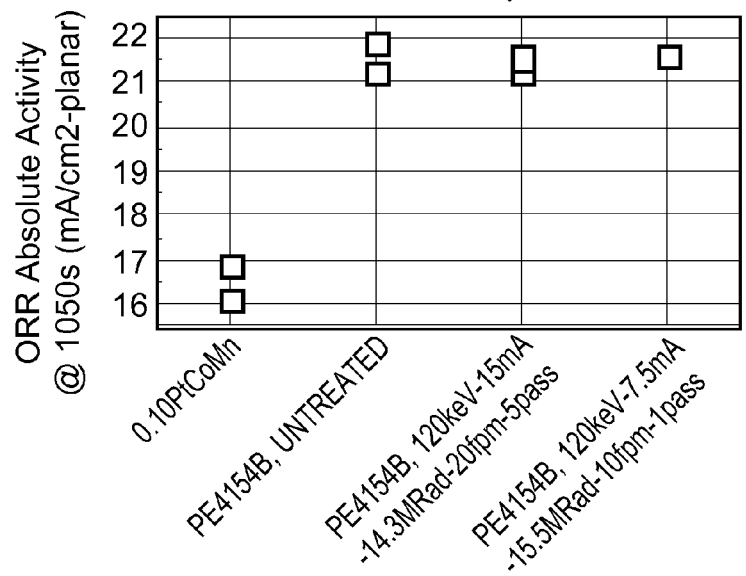

FIG. 14D represents oxygen reduction reaction (ORR) fuel cell metrics measured for the samples 7-2 and 7-3 in Table 5.1 and untreated controls. FIG. 14D compares the samples' oxygen reduction reaction fuel cell metrics, including the absolute activity, surface area and specific activity. The surface area and absolute activity were essentially unchanged by the e-beam treatment, but the specific activity was reduced compared to the average of the controls.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of making an enhanced activity catalyst comprising the steps of:
   a) providing a nanostructured thin film catalyst;
   b) radiation annealing the nanostructured thin film catalyst under an inert gas having a residual oxygen level of 100 ppm or less by irradiation at an incident energy fluence of at least 30 mJ/mm$^2$.

2. The method according to claim 1 wherein the inert gas has a residual oxygen level of 50 ppm or less.

3. The method according to claim 1 wherein the incident energy fluence is between 35 and 40 mJ/mm$^2$.

4. The method according to claim 2 wherein the incident energy fluence is between 35 and 40 mJ/mm$^2$.

5. The method according to claim 1 wherein step b) of radiation annealing is laser annealing.

6. The method according to claim 2 wherein step b) of radiation annealing is laser annealing.

7. The method according to claim 3 wherein step h) of radiation annealing is laser annealing.

8. The method according to claim 4 wherein step b) of radiation annealing is laser annealing.

9. The method according to claim 1 wherein step b) of radiation annealing is laser annealing by use of a CO$_2$ laser.

10. The method according to claim 2 wherein step b) of radiation annealing is laser annealing by use of a CO$_2$ laser.

11. The method according to claim 3 wherein step h) of radiation annealing is laser annealing by use of a CO$_2$ laser.

12. The method according to claim 4 wherein step h) of radiation annealing is laser annealing by use of a $CO_2$ laser.

13. The method according to claim wherein step b) of radiation annealing is electron beam annealing.

14. The method according to claim 2 wherein step b) of radiation annealing is electron beam annealing.

15. The method according to claim 3 wherein step b) of radiation annealing is electron beam annealing.

16. The method according to claim 4 wherein step b) of radiation annealing is electron beam annealing.

17. The method according to claim 1 wherein the nanostructured thin film catalyst is provided on a continuous web.

18. The method according to claim 3 wherein the nanostructured thin film catalyst is provided on a continuous web.

19. The method according to claim 5 wherein the nanostructured thin film catalyst is provided on a continuous web.

20. The method according to claim 12 wherein the nanostructured thin film catalyst is provided on a continuous web.

* * * * *

UNITED STATES PATENT AND TRADEMARK OFFICE
CERTIFICATE OF CORRECTION

PATENT NO. : 8,748,330 B2  
APPLICATION NO. : 13/643431  
DATED : June 10, 2014  
INVENTOR(S) : Mark Debe Page 1 of 1

It is certified that error appears in the above-identified patent and that said Letters Patent is hereby corrected as shown below:

In the Specification

Column 1  
Line 5, delete "07G017007" and insert -- 07GO17007 --, therefor.  
Line 8, delete "INVENTION" and insert -- DISCLOSURE --, therefor.

Column 3  
Line 47, delete "(A/mgp$_t$)" and insert -- (A/mg$_{Pt}$) --, therefor.

Column 5  
Line 36, delete "Pt(hk1)" and insert -- Pt(hkl) --, therefor.

Column 10  
Line 29, delete "e.g.10 ton" and insert -- e.g. 10 torr --, therefor.  
Line 30, delete "Ton," and insert -- Torr, --, therefor.

Column 11  
Line 24, delete "Ton" and insert -- Torr --, therefor.

In the Claims

Column 12  
Line 58, in Claim 7, delete "h)" and insert -- b) --, therefor.  
Line 66, in Claim 11, delete "h)" and insert -- b) --, therefor.

Column 13  
Line 1, in Claim 12, delete "h)" and insert -- b) --, therefor.  
Line 3, in Claim 13, delete "claim" and insert -- claim 1 --, therefor.

Signed and Sealed this  
Eleventh Day of November, 2014

Michelle K. Lee  
*Deputy Director of the United States Patent and Trademark Office*